United States Patent
Higashino et al.

(10) Patent No.: US 7,697,234 B2
(45) Date of Patent: Apr. 13, 2010

(54) STORAGE APPARATUS, CONTROL METHOD, AND CONTROL DEVICE WHICH ENABLE OR DISABLE COMPENSATION CONTROL

(75) Inventors: Yoshinari Higashino, Kawasaki (JP); Shigenori Yanagi, Kawasaki (JP)

(73) Assignee: Toshiba Storage Device Corporation, Tokyo (JP)

(*) Notice: Subject to any disclaimer, the term of this patent is extended or adjusted under 35 U.S.C. 154(b) by 63 days.

(21) Appl. No.: 12/034,147

(22) Filed: Feb. 20, 2008

(65) Prior Publication Data
US 2009/0034116 A1    Feb. 5, 2009

(30) Foreign Application Priority Data
Jul. 30, 2007    (JP)    ............... 2007-197281

(51) Int. Cl.
G11B 5/596    (2006.01)
(52) U.S. Cl. .................................. 360/77.03
(58) Field of Classification Search ............... None
See application file for complete search history.

(56) References Cited

U.S. PATENT DOCUMENTS

| | | | | |
|---|---|---|---|---|
| 5,299,075 A | * | 3/1994 | Hanks | 360/77.02 |
| 5,581,521 A | | 12/1996 | Nomura et al. | |
| 5,663,847 A | * | 9/1997 | Abramovitch | 360/77.02 |
| 7,141,951 B2 | * | 11/2006 | Hosono et al. | 360/75 |
| 7,145,307 B2 | * | 12/2006 | Hosono et al. | 360/75 |
| 7,177,113 B1 | * | 2/2007 | Semba et al. | 360/77.07 |
| 7,468,857 B2 | * | 12/2008 | Hutsell et al. | 360/77.03 |
| 2007/0070540 A1 | * | 3/2007 | Noguchi et al. | 360/75 |

FOREIGN PATENT DOCUMENTS

| | | |
|---|---|---|
| JP | A 63-213176 | 9/1988 |
| JP | A 8-17151 | 1/1996 |
| JP | A 9-326107 | 12/1997 |
| JP | A 2000-322812 | 11/2000 |
| JP | A 2004-30861 | 1/2004 |
| JP | A 2006-221732 | 8/2006 |
| KR | 2001-0053463 | 6/2001 |
| KR | 2003-0043769 | 6/2003 |

* cited by examiner

*Primary Examiner*—Hoa T Nguyen
*Assistant Examiner*—James L Habermehl
(74) *Attorney, Agent, or Firm*—Greer, Burns & Crain, Ltd.

(57) ABSTRACT

A rotation disturbance compensation control unit applies a compensation signal to a positioning control unit so as to cancel out rotation disturbance vibration components detected by using acceleration velocity sensors. At predetermined timing, a position error detection unit detects respective position errors of the case in which the rotation disturbance compensation control unit is turned on and the case in which it is turned off. A compensation control switching unit switches the rotation disturbance compensation control unit to be on if the position error of the case in which the compensation control of rotation disturbance is turned on is small and switches the compensation control switching unit to be off if the position error of the case in which the compensation control of rotation disturbance is turned off is small.

17 Claims, 19 Drawing Sheets

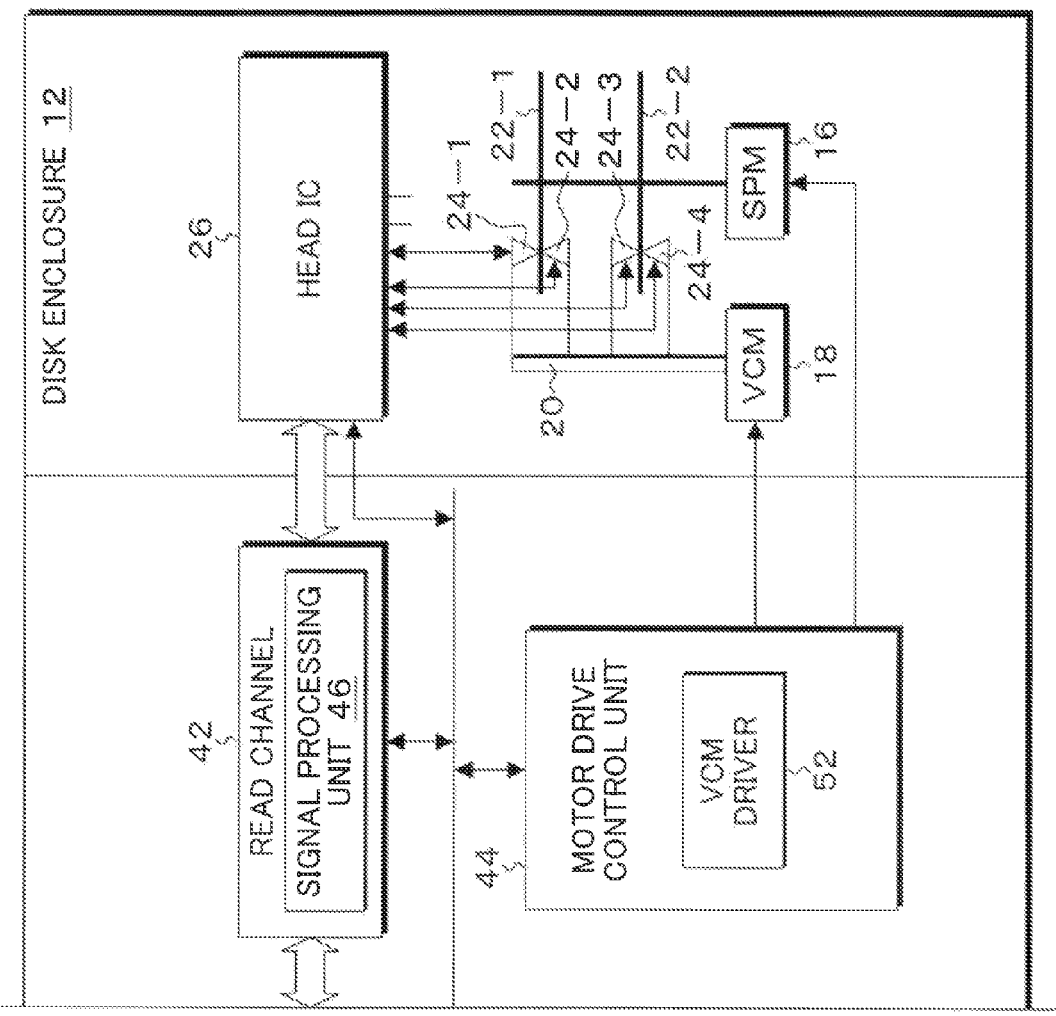

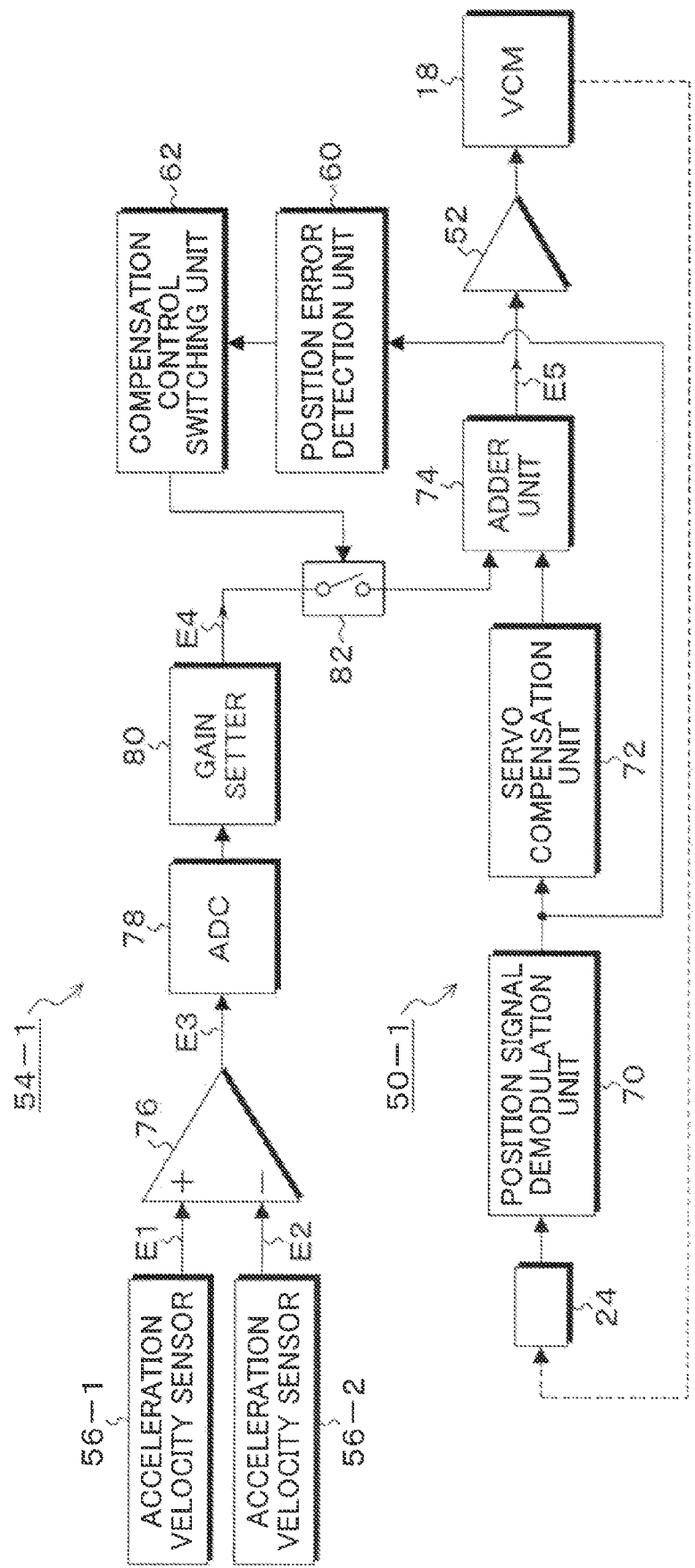

POSITION ERROR

ROTATION DISTURBANCE
COMPENSATION CONTROL

POSITION ERROR SQUARE INTEGRATION VALUE

POSITION ERROR

ROTATION DISTURBANCE
COMPENSATION CONTROL

POSITION ERROR SQUARE INTEGRATION VALUE

POSITION ERROR

ROTATION DISTURBANCE COMPENSATION CONTROL

POSITION ERROR SQUARE INTEGRATION VALUE

POSITION ERROR

ROTATION DISTURBANCE COMPENSATION CONTROL

POSITION ERROR SQUARE INTEGRATION VALUE

STORAGE APPARATUS, CONTROL METHOD, AND CONTROL DEVICE WHICH ENABLE OR DISABLE COMPENSATION CONTROL

This application is a priority based on prior application No. JP 2007-197281, filed Jul. 30, 2007, in Japan.

BACKGROUND OF THE INVENTION

1. Field of the Invention

The present invention relates to a storage apparatus such as a magnetic disk apparatus, a control method, and a control device which positions a head on a target track of a rotating storage medium and causes the head to follow it and particularly, relates to the storage apparatus, the control method, and the control device which compensates for rotation disturbance vibrations applied to the apparatus so as to ensure head positioning accuracy.

2. Description of the Related Arts

Conventionally, in a magnetic disk apparatus, a head position signal is demodulated from servo information of a magnetic disk read from a head, and following control (also referred to as "on-track control") which positions the head so that the head tracks the track center of a target track is carried out based on the head position signal. However, in a usage environment of the magnetic disk apparatus, it is put in a rack of, for example, a server or a storage system; therefore, it is affected by the vibrations of a fan or another magnetic disk apparatus. These vibrations physically vibrate a rotary actuator, and the vibrations appear in the head position signal as disturbance. The vibrations applied to the magnetic disk apparatus include translation vibrations and torsion vibrations. The translation vibrations are the vibrations that move the entire apparatus in one direction and do not affect head positioning since the rotary actuator also integrally vibrate. On the other hand, the torsion vibrations are the vibrations that moves the entire apparatus in a rotation direction about a certain position, become the vibrations that moves the rotary actuator rotatably supported by a pivot shaft in the rotation direction, and become disturbance that causes a head position error, which is called rotation disturbance vibrations. In order to eliminate the deterioration in the positioning accuracy due to such rotation disturbance vibrations, in a conventional magnetic disk apparatus, an acceleration velocity sensor, which detects the disturbance vibrations, is provided, and a servo compensation signal which is proportional to the output of the acceleration velocity sensor is added to a positioning control servo system so as to cancel them out; thus, even when unexpected disturbance vibrations from outside are applied, the head position error caused by the external vibration factor can be reduced (Patent document 1).

[Patent document 1] Japanese Patent Application Laid-Open Publication No. S63-213176
[Patent document 2] Japanese Patent Application Laid-Open Publication No. 2006-221732
[Patent document 3] Japanese Patent Application Laid-Open Publication No. H08-17151

However, in the conventional compensation control using the acceleration velocity sensor, the signals output from the acceleration velocity sensor may include noise components caused by the factors other than the rotation disturbance vibrations such as translation vibrations, power source ripples, and the S/N ratio of the sensor itself in some cases, and there is a problem that the positioning accuracy is deteriorated by the influence of the noise components contained in the compensation signals of the rotation disturbance vibrations added to the positioning control system. The acceleration velocity sensor used in the compensation control is intended to detect the rotation disturbance vibrations in the disk plane (X-Y plane) of the magnetic disk apparatus; however, in practice, there is a problem that the output of the acceleration velocity sensor includes signal components other than the rotation disturbance vibrations caused by power source ripple noise or translation in the direction (Z direction) orthogonal to the disk plane, appropriate sensor signals are fed forward to the positioning control system as a result, and the head positioning error is worsen. Even in a normal case in which no disturbance vibrations or noise are applied to the acceleration velocity sensor, the sensor signal contains noise, components due to the influence of the S/N ratio of the acceleration velocity sensor itself. There is also a problem that the positioning accuracy is worsen when such sensor signal is fed forward to the positioning control system.

SUMMARY OF THE INVENTION

According to the present invention to provide a storage apparatus, a control method, and a control method which reliably prevent the deterioration of the head positioning accuracy during the following control even when the signals from the acceleration velocity sensor include foreign noise such as power source ripples or noise due to SN of the sensor itself.

(Storage Apparatus)

The present invention provides a storage apparatus. The storage apparatus of the present invention has characteristics that include:

a positioning control unit which positions a head to a target track of a rotating storage medium and causes the head to follow it;

a compensation control unit (rotation disturbance compensation control unit) which applies a compensation signal to the positioning control unit so that a rotation disturbance vibration component detected by an acceleration velocity sensor is cancelled out;

a position error detection unit which detects, at predetermined timing, respective position errors according to the positioning control unit in the case in which the compensation control unit is enabled and the case in which the compensation control unit is disabled; and a compensation control switching unit which switches the compensation control unit either between an enabled state and a disabled state based on the magnitude relation of two position errors detected by the position error detection unit.

The position error detection unit discretely detects the respective position errors according to the positioning control unit in the case in which the compensation control unit is enabled and the case in which the compensation control unit is disabled in a predetermined period and detects a square integration value of the position errors over the predetermined period; and the compensation control switching unit
disables the compensation control unit if both the two position errors are less than a predetermined threshold value and
enables or disables the compensation control unit based on the magnitude relation of the two square integration values if at least either one of the two position errors exceeds a predetermined threshold value.

The compensation control switching unit
enables the compensation control unit if the square integration value of the case in which the compensation control unit is enabled is small and disables the compensation control unit if the square integration value of the case in which the compensation control unit is disabled is small.

The compensation control switching unit turns on the compensation signal to be applied to the positioning control unit if the compensation control unit is to be enabled and turns off the compensation signal to be applied to the positioning control unit if the compensation control unit is to be disabled.

The compensation control switching unit adjusts the compensation signal to be applied to the positioning control unit by multiplying the signal by a predetermined gain if the compensation control unit is to be enabled and turns off the compensation signal to be applied to the positioning control unit if the compensation control unit is to be disabled.

The position error detection unit and the compensation control switching unit operate upon occurrence of write retry. The position error detection unit and the compensation control switching unit operate upon occurrence of read retry. The position error detection unit and the compensation control switching unit operate upon transition to idle in which no command is received from a host.

The compensation control unit detects a differential signal of acceleration velocity detection signals from a pair of acceleration velocity sensors as the rotation disturbance vibration detection signal.

(Control Method of Storage Apparatus)

The present invention provides a control method of a storage apparatus. The control method of the storage apparatus according to the present invention has characteristics that include:

a positioning control step of positioning a head to a target track of a rotating storage medium and causing the head to follow it;

a compensation control step of applying a compensation signal to the positioning control step so that a rotation disturbance vibration component detected by an acceleration velocity sensor is cancelled out;

a position error detection step of detecting, at predetermined timing respective position errors according to the positioning control step in the case in which the compensation control step is enabled and the case in which the compensation control step is disabled; and a compensation control switching step of switching the compensation control step either between an enabled state and a disabled state based on the magnitude relation of two position errors detected by the position error detection step.

(Control Device)

The present invention provides a control device of a storage apparatus. The control device of the present invention has characteristics that include:

a positioning control unit which positions a head to a target track of a rotating storage medium and causes the head to follow it;

a compensation control unit which applies a compensation signal to the positioning control unit so that a rotation disturbance vibration component detected by an acceleration sensor is cancelled out;

a position error detection unit which detects, at predetermined timing, respective position errors according to the positioning control unit in the case in which the compensation control unit is enabled and the case in which the compensation control unit is disabled; and a compensation control switching unit which switches the compensation control unit either between an enabled state and a disabled state based on the magnitude relation of two position errors detected by the position error detection unit.

According to the present invention, influence imposed on head positioning control is respectively detected as position errors when compensation control is enabled and disabled, and the compensation control is enabled or disabled corresponding to the smaller one of the position errors. Therefore, when the signal from the acceleration velocity sensors includes rotation disturbance vibration components, the compensation control is enabled so as to enhance the head positioning accuracy. On the other hand, when the signal from the acceleration velocity sensors includes foreign noise such as translation disturbance vibration components or power source ripple, the compensation control is disabled, and the noise components cased by the compensation signal are not applied to the positioning control system. Therefore, deterioration of the head positioning accuracy due to the noise components can be prevented.

Moreover, also regarding the noise due to the sensor itself caused by the S/N ratio of the acceleration velocity sensor in a normal case in which no translation vibration disturbance and foreign noise is applied, the compensation control is disabled, and deterioration of the head positioning accuracy due to the noise component can be prevented.

Instead of performing the process of enabling or disabling the compensation control by detecting the position errors in the case in which the compensation control is enabled and the case in which it is disabled and according to the magnitude relation, the timing of performing the process is limited to upon write retry, read retry, or idle transition; therefore, the influence on the apparatus performance can be suppressed. The above and other objects, features, and advantages of the present invention will become more apparent from the following detailed description with reference to the drawings.

BRIEF DESCRIPTION OF THE DRAWINGS

FIGS. 1A and 1B are block diagrams showing an embodiment of a magnetic disk apparatus to which the present invention is applied;

FIG. 8 is a block diagram showing a functional configuration of a positioning control system and a rotation disturbance compensation control system in the present embodiment;

DETAILED DESCRIPTION OF THE PREFERRED EMBODIMENTS

Figure 1A:
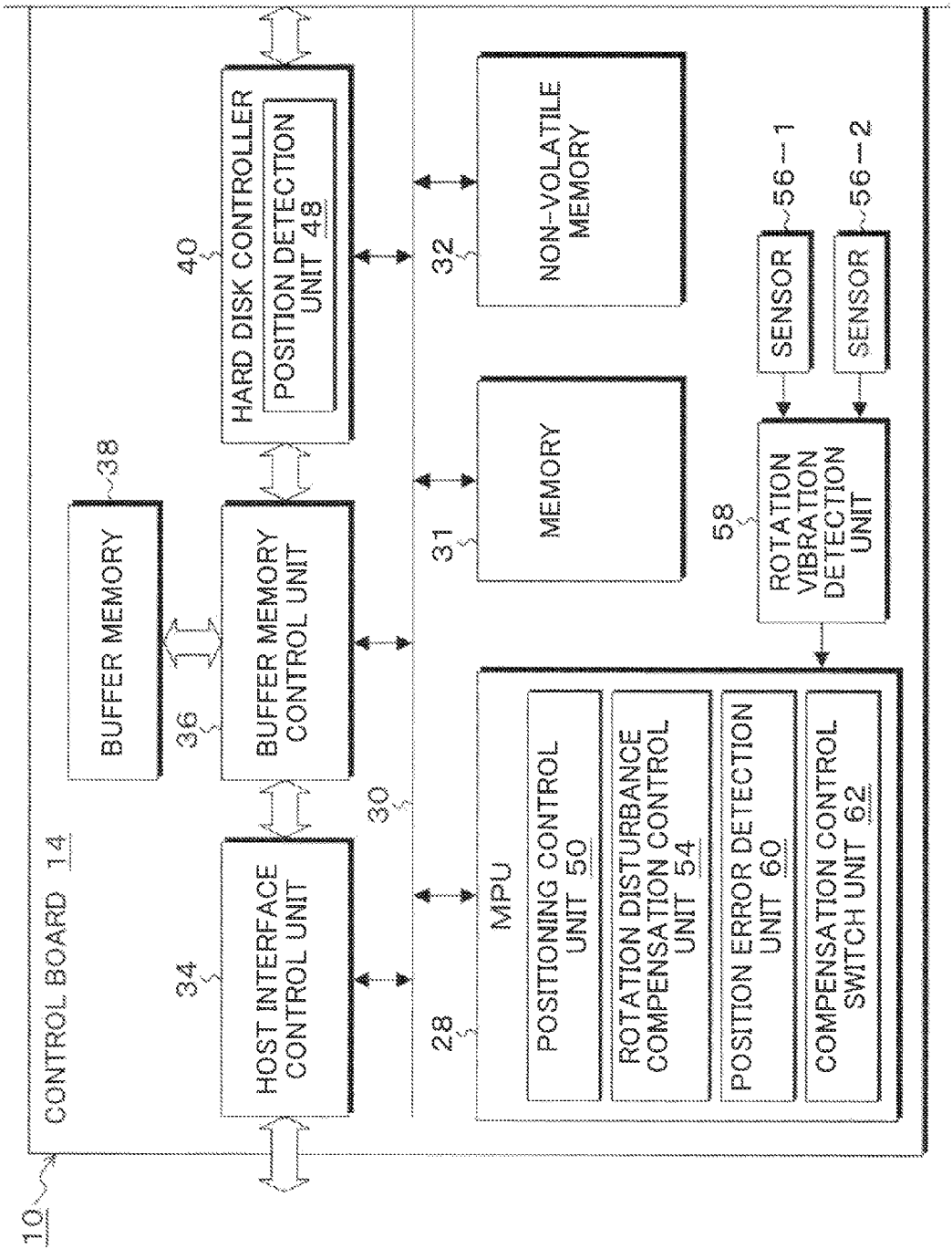

FIGS. 1A and 1B are block diagrams showing an embodiment of a magnetic disk apparatus to which the present invention is applied. In FIGS. 1A and 1B the magnetic disk apparatus 10 which is known as a hard disk drive (HDD) is composed of a disk enclosure 12 and a control board 14. A spindle motor 16 is provided in the disk enclosure 12; and magnetic disks (storage media) 22-1 and 22-2 are attached to a rotating shaft of the spindle motor 16 and rotated at a constant number of rotations, for example, at 4200 rpm. In addition, a voice coil motor 18 is provided in the disk enclosure 12, wherein the voice coil motor 18 drives a rotary actuator 20 and performs head positioning of heads 24-1 to 24-4 supported at arm distal ends with respect to the recording surfaces of the magnetic disks 22-1 and 22-2. The heads 24-1 to 24-4 are composite-type heads in which recording elements and reading elements are integrated. In-plane magnetic recording type recording elements or perpendicular magnetic recording type recording elements are used as the recording elements. In the case of the perpendicular magnetic recording type recording elements, for example, perpendicular storage media having recording layers and soft magnetic backing layers are used as the magnetic disks 22-1 and 22-2. GMR elements or TMR elements are used as the reading elements. The heads 24-1 to 24-4 are connected to a head IC 26 by signal lines, and the head IC 26 selects one of the heads according to a head select signal based on a write command or a read command from a host, which serves as an upper-level apparatus, so as to perform a write or a read. Moreover, in the head IC 26, a write driver is provided for a write system, and a preamplifier is provided for a read system. An MPU 28 is provided in the control board 14, and, with respect to a bus 30 of the MPU 28, a memory 31, which stores a control program (firmware program) and control data using a RAM, and a non-volatile memory 32, which stores a control program (firmware program) using a flash memory or the like, are provided. In addition, with respect to the bus 30 of the MPU 28, a host interface control unit 34, a buffer memory control unit 36 which controls a buffer memory 38, a hard disk controller 40 which functions as a formatter, a read channel 42 which functions as a write modulation unit and a read modulation unit, and a motor drive control unit 44 which controls the voice coil motor 18 and the spindle motor 16 are provided. Note that, depending on the mounting area of the control, board 14, the MPU 28, the host interface control unit 34, the buffer memory control unit 36, the hard disk controller 40, and the read channel 42 which are various control devices may be built as individual LSI circuits, or a plurality of them, for example, the MPU 28, the hard disk controller 40, and the read channel 42, may be selected and built as one LSI circuit. The MPU 28 performs writing processes and reading processes based on commands from the host. Herein, normal operations in the magnetic disk apparatus 10 will be described below. When a write command and write data from the host is received by the host interface control unit 34, the write command is decoded by the MPU 28, the received write data is stored in the buffer memory 38 in accordance with needs. Then, it is converted into a predetermined data format by the hard disk controller 40, an ECC code is added thereto by ECC encoding processing, and scrambling, RLL code conversion, and write compensation is performed in the write modulation system in the read channel. 42. Then, it is written to the magnetic disk 22-1 from the write amplifier via the head IC 26 and from the recording element of, for example, the selected head 24-1. When the write data is to be written to the magnetic disk 22-1, a head positioning signal is given from the MPU 28 to the motor drive control unit 44, the head is caused to seek a target track specified by the command by driving the rotary actuator 20 by the voice coil motor 18, and then, following control of positioning it to the track center is performed. Specifically, servo information is recorded on the magnetic disk 22-1 in the circumferential direction at constant angle intervals and, after the servo information read by the head 24-1 is demodulated by a signal processing unit 46 provided in the read channel 42, the head position is detected by a position detection unit 48 provided in the hard disk controller 4. The head positioning signal is given from the MPU 28 to the motor drive control unit 44, and the rotary actuator 20 is driven by driving the voice coil motor 18 by a VCM driver 52, thereby causing the head to seek the target track specified by the command. Then the head is placed on the track, and following control is performed. Note that, the position detection unit 48 may be realized as a function of the MPU 28. Meanwhile, when a read command from the host is received by the host interface control unit 34, the read command is decoded by the MPU 28, and read signals read by the reading element of the head which is selected by head selection of the head IC 26 are amplified by the preamplifier. Then, they are input to the read demodulation system of the read channel 42, read data is demodulated by partial response maximum likelihood detection (PRML) or the like, and errors are corrected by performing ECC decoding processing by the hard disk controller 40. Then, they are buffered in the buffer memory 38, and the read data is transferred from the host interface control unit 34 to the host. Furthermore, in the control board 14 in the magnetic disk apparatus 10 of the present embodiment, in order to compensate for the head position errors due to rotation disturbance vibrations applied to the apparatus, a pair of acceleration velocity sensors 56-1 and 56-2 and a rotation vibration detection unit 58, and, as functions realized by executing programs of the MPU 28, a rotation disturbance compensation control unit 54, a position error detection unit 60, and a compensation switching unit 62 are provided. The rotation disturbance compensation control unit 54 performs feed forward control by applying a compensation signal to a positioning control unit 50 so as to cancel out the rotation disturbance vibration component which is detected by the acceleration velocity sensors 56-1 and 56-2 and the rotation vibration detection unit 58 and applied to the magnetic disk apparatus 10. At predetermined timing, which is determined in advance, the position error detection unit 60 detects the position error in the positioning control unit 50 of each of the cases in which the compensation signal of the rotation disturbance compensation control unit 54 is enabled and disabled. Specifically, the position error detection unit 60 executes the position error detection process at any of the timing (1) upon write retry occurrence,
(2) upon read retry occurrence, and
(3) upon transition of performance idle when no command is received from the host.

In the process of the position error detection unit 60, separately in the case in which the control function of the rotation disturbance compensation control unit 54 is enabled and the case in which it is disabled, the position errors of the positioning control unit 50 over a certain period of each of the cases and integration values of the squared position errors of the certain period are also detected. Herein, enabling the rotation disturbance compensation control unit 54 means to perform feed forward control by applying the compensation signal generated by the rotation disturbance compensation control unit 54 to the positioning control unit 50. On the other hand, disabling the rotation disturbance compensation control unit 54 means not to perform the feed forward control without applying the compensation signal generated by the rotation disturbance compensation control unit 54 to the positioning control unit 50. Specifically, a switch provided on a path through which the compensation signal is applied from the rotation disturbance compensation control unit 54 to the control unit 50 is turned on when it is enabled and turned off when it is disabled. Alternatively, without depending on the on/off switching of the switch, the gain of the compensation signal fed from the rotation disturbance compensation control unit 54 to the positioning control unit 50 may be adjusted. When the rotation disturbance compensation control unit 54 is to be enabled, gain=1 is set, and the compensation signal is applied to the positioning control unit 50 without change. This is equivalent to turning on the switch for applying the compensation signal to the positioning control unit 52. When the rotation disturbance compensation control unit 54 is to be disabled, gain=0 is set, and the compensation signal applied to the positioning control unit 50 is caused to be zero. This is equivalent to turning off the switch for applying the compensation signal to the positioning control unit 50. Furthermore, regarding the gain setting of the case in which the rotation disturbance compensation control unit 54 is to be enabled, the gain may be adjusted to a range of more than 0 and less than 1 or a range of more than 1 in accordance with needs. Therefore, enabling of the rotation disturbance compensation control unit 54 also means multiplying the compensation signal by the predetermined gain. At the above described timing upon occurrence of write retry, upon occurrence of read retry, or upon performance idle transition, the rotation disturbance compensation control unit 54 detects a plurality of position errors detected in synchronization with a servo sample over one rotation of the disk in the positioning control unit 50 and the square integration value of the position errors over one rotation of the disk both in the state in which the switch for feeding the compensation signal from the rotation disturbance compensation control unit 54 to the positioning control unit 50 is turned on and the state in which it is turned off. Herein, the square integration value based on the position errors of the case in which the rotation disturbance compensation control unit 54 is turned on is A, and the square integration value of the position errors of the case in which the rotation disturbance compensation control unit 54 is turned off is B. The compensation control switching unit 62 turns on or off the rotation disturbance compensation control unit 54 based on the magnitude relation of the position errors which are detected by the position error detection unit 60 and obtained respectively in the cases in which the rotation disturbance compensation unit 54 is on and off. Specifically, the position errors detected in the case in which the rotation disturbance compensation control unit 54 is turned on and the case in which it is turned off are compared with predetermined slice levels (threshold values), and the number of times that they exceed the slice levels is detected. When the number of times they exceed the slice levels is less than a predetermined value, specifically, when the number of times=0, the rotation disturbance compensation control unit 54 is turned off so that the compensation signal is not applied from the rotation disturbance compensation control unit 54 to the positioning control unit 50. On the other hand, when the number of times that at least either one of the position errors detected when the rotation disturbance compensation control unit 54 is on and off exceeds a predetermined value, specifically, when it is one or more, the rotation disturbance compensation control unit 54 is turned on or off based on the magnitude relation of the two square integration values A and B. Switching between on and off of the rotation disturbance compensation control unit 54 based on the magnitude relation of the two square integration values A and B is as described below.

(1) When the square integration value A of the position errors detected when the rotation disturbance compensation control unit 54 is turned on is smaller than the square integration value B of the position errors detected when the rotation disturbance compensation control unit 54 is turned off, the rotation disturbance compensation control unit 54 is turned on, and the rotation disturbance compensation signal is applied to the positioning control unit 50.

(2) When the square integration value B of the position errors detected when the rotation disturbance compensation control unit 54 is turned off is smaller than the square integration value A of the position errors detected when the rotation disturbance compensation control unit 54 is turned on, the rotation disturbance compensation control unit 54 is turned off so that the rotation disturbance compensation signal is not applied to the positioning control unit 50.

Figure 2:
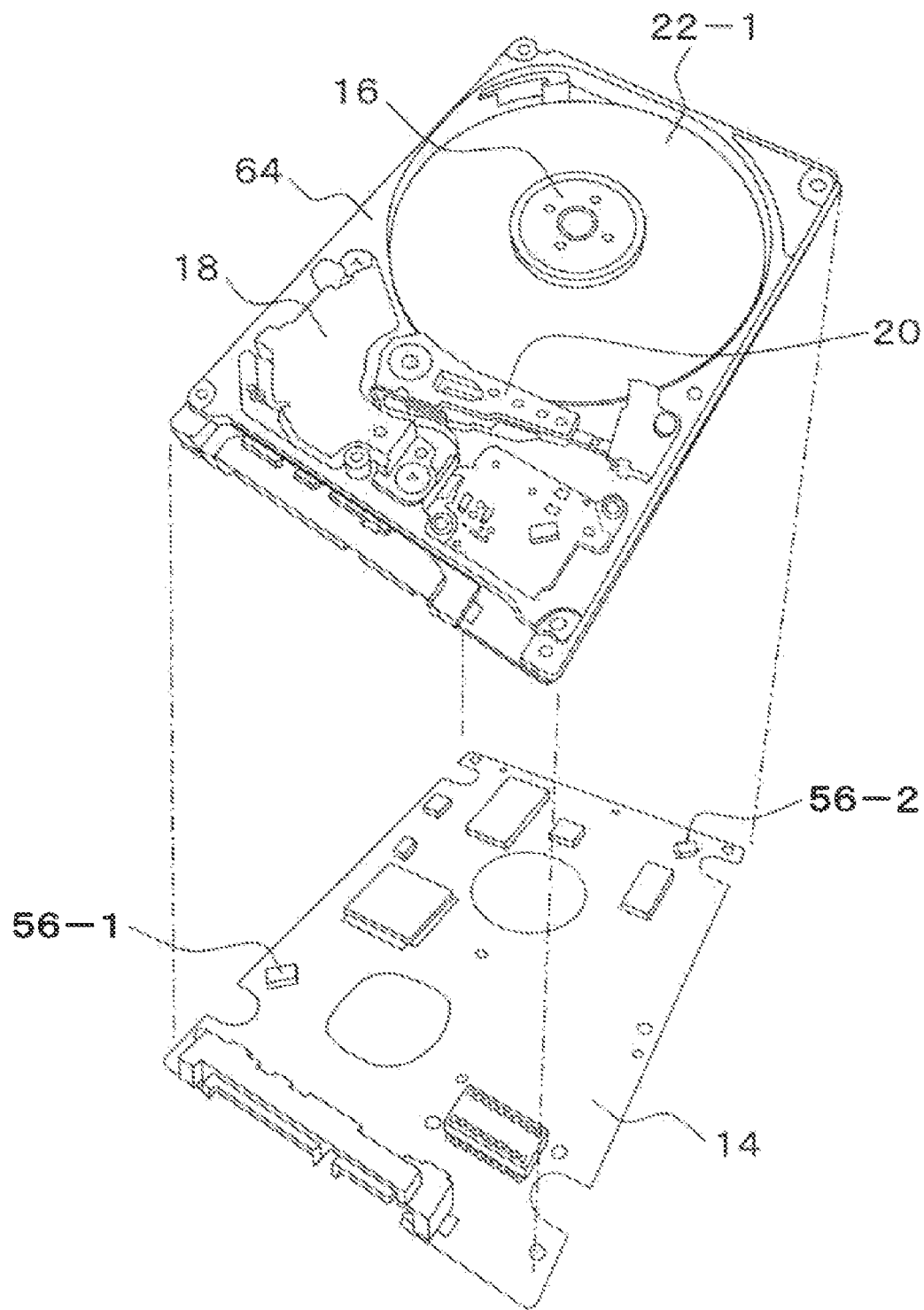
FIG. 2 is an explanatory drawing showing an internal structure of the present embodiment and location of acceleration velocity sensors with respect to the control board.

FIG. 2 is an explanatory drawing showing an inner structure of the present embodiment and the locations of acceleration velocity sensors with respect to the control board. In FIG. 2, in the magnetic disk apparatus of the present embodiment, the magnetic disks 22-1 and 22-2 (not shown) which are rotated at a constant speed by the spindle motor 16 are disposed on a base 64. With respect to the magnetic disks 22-1 and 22-2, the rotary actuator 20 rotatably supported by the pivot shaft is disposed, and the heads are supported by the distal ends thereof. The VCM 18 is disposed in the opposite side of the head attaching side of the rotary actuator 20. The VCM 18 includes a coil attached to the rotary actuator 20 side and yokes which are disposed in the upper and lower side and attached to a permanent magnet fixed in the base 64 side. The control board (circuit board) 14 is disposed in the back side of the base 64, and, as shown in the lower side in an exploded manner, the pair of acceleration velocity sensors 56-1 and 56-2 is disposed, for example, at corner parts in a diagonal direction capable of ensuring a longest installation distance on the control board 14. The acceleration velocity sensors 56-1 and 56-2 use piezoelectric elements, for example, piezo resistance elements as detection elements and outputs acceleration velocity detection signals in the polarity corresponding to the direction of the acceleration velocity applied to the sensor and at the level corresponding to the magnitude of the acceleration velocity.

Figure 3:
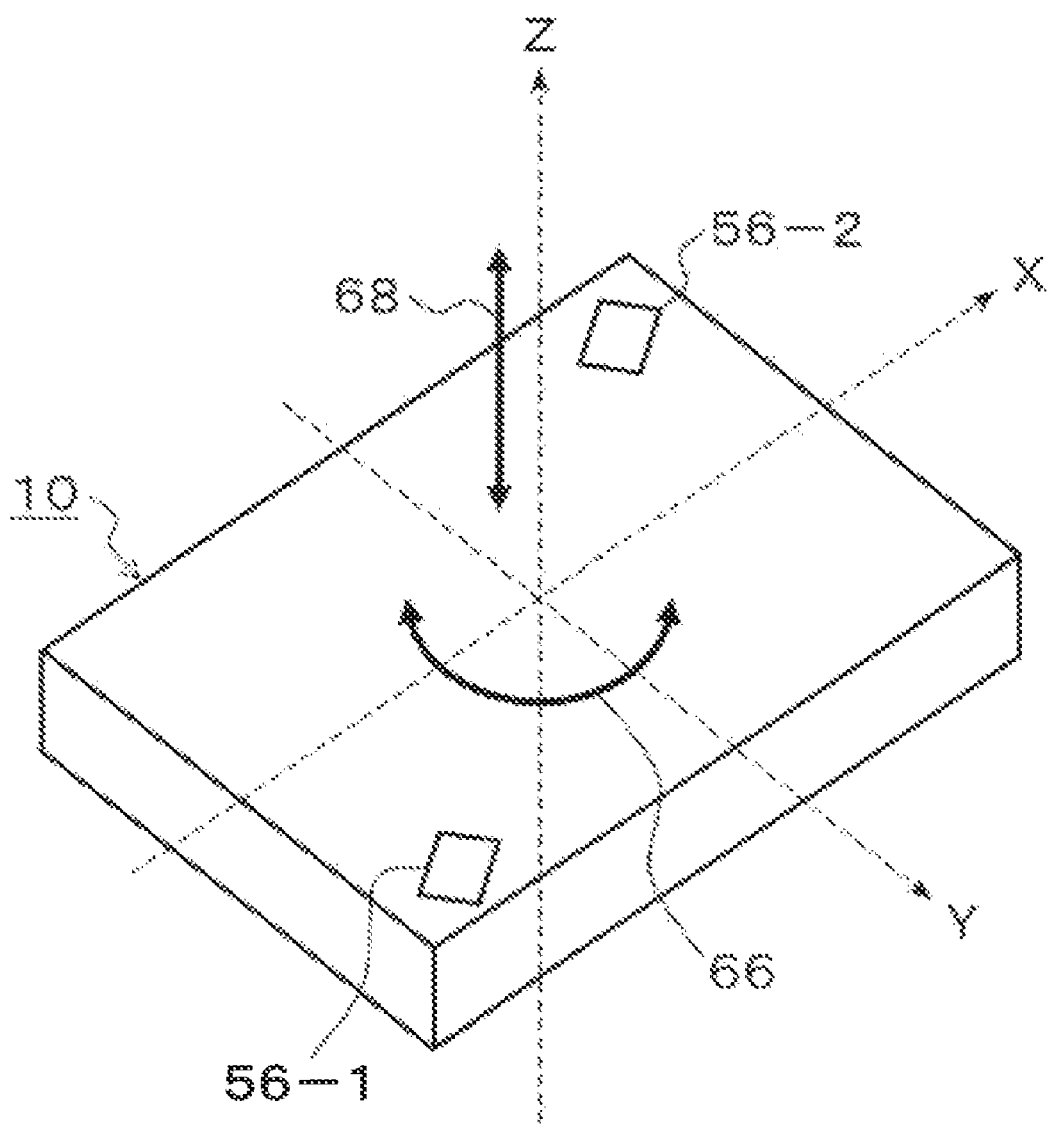
FIG. 3 is an explanatory drawing showing rotation disturbance vibration and translation disturbance vibration applied to the present embodiment.

FIG. 3 is an explanatory drawing showing rotation disturbance vibrations and translation disturbance vibrations applied to the present embodiment. In FIG. 3, in the magnetic disk apparatus 10, the pair of acceleration velocity sensors 56-1 and 56-2 are installed at the corner parts in the diagonal direction of the control board as shown in FIG. 2. Herein, a Z axis and a Y axis are set on the plane along the magnetic disk medium surface of the magnetic disk apparatus 10 so as to provide a XY plane, and the height direction orthogonal to the XY plane is a Z axis. With respect to the magnetic disk apparatus 10 for which such three-dimensional coordinates are assumed to be present, the disturbance vibrations that generates detection outputs in the acceleration velocity sensors 56-1 and 56-2 include rotation disturbance vibrations 66 applied in the X-axis plane and translation disturbance vibrations 68 applied in the Z axis direction. In the present embodiment, the rotation disturbance vibrations 66 are detected by the acceleration velocity sensors 56-1 and 56-2 so as to perform compensation of positioning control; however, other than the rotation disturbance vibrations 66, acceleration velocity components caused by the translation disturbance vibrations 68 in the Z-axis direction are also output from the acceleration velocity sensors 56-1 and 56-2, and the outputs of the acceleration velocity sensors 56-1 and 56-2 caused by the translation disturbance vibrations 68 are not relevant to the rotation disturbance vibrations 66 which are originally to be compensated for; therefore, when they are applied to the positioning control unit 50 as the compensation signal, the position errors are reversely increased. Other than that, the components which are contained in the acceleration velocity detection signals output from the acceleration velocity sensors 56-1 and 56-2 and increase the position errors include foreign noise such as power source ripple noise and noise caused by the S/N ratios of the sensors itself of the acceleration velocity sensors 56-1 aid 56-2.

Figure 4:
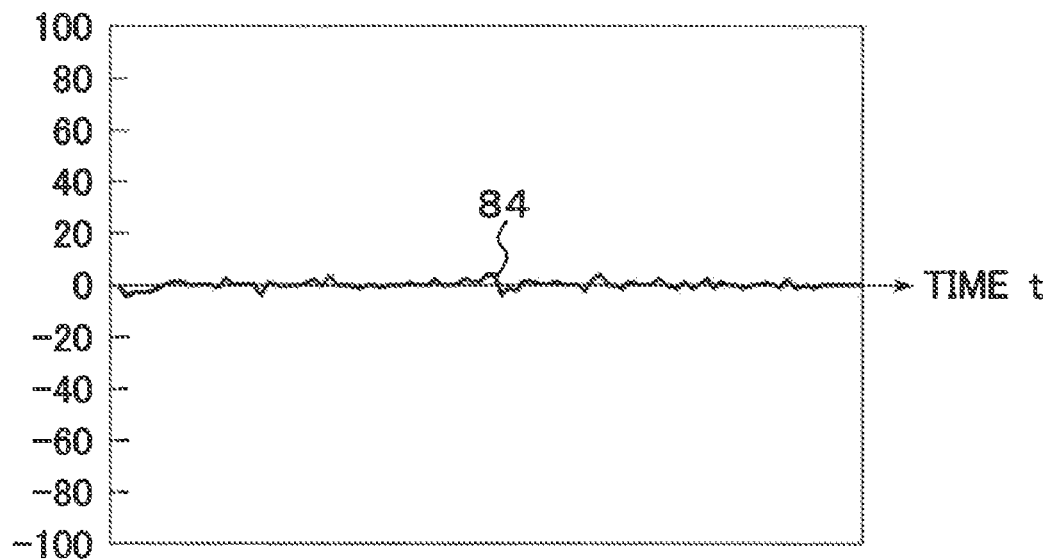
FIG. 4 is a time chart showing an acceleration velocity detection signal of a normal case.

FIG. 4 is a time chart showing an acceleration velocity detection signal obtained from a differential signal of the acceleration velocity sensor 56-1 and the acceleration velocity sensor 56-2 in a normal case in the present embodiment. The acceleration velocity detection signal 84 of the normal case is flat since an acceleration velocity is basically not generated; however, minute noise caused by the S/N ratio of the sensors itself is randomly contained, and adding the compensation signal containing the noise to the positioning control unit 50 leads to deterioration of the position errors.

Figure 5:
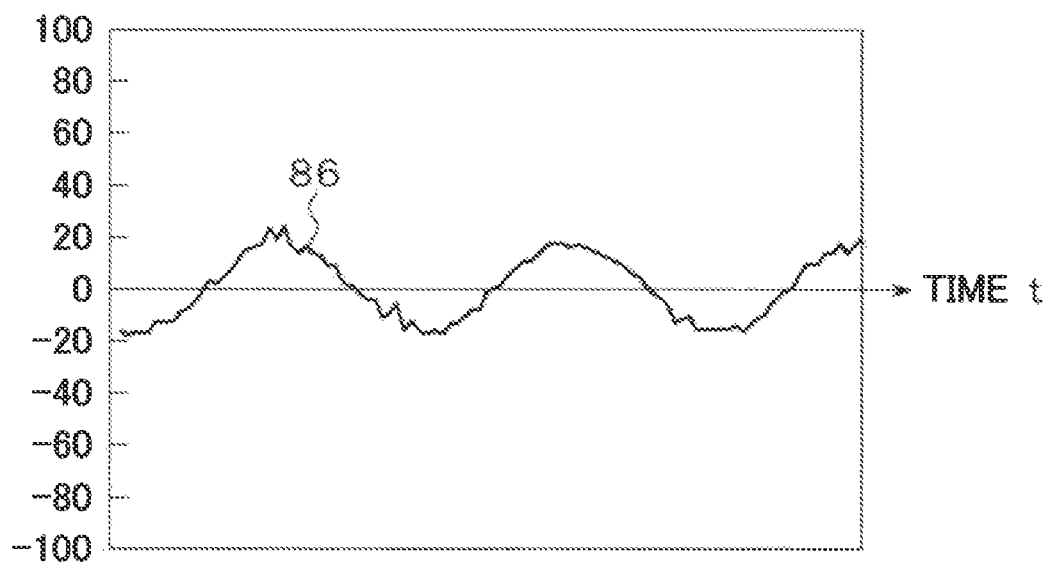
FIG. 5 is a time chart showing an acceleration velocity detection signal when rotation disturbance vibration is applied.

FIG. 5 is a time chart showing an acceleration velocity detection signal 86 of the acceleration velocity sensors in the case in which the rotation disturbance vibrations 66 shown in FIG. 3 around the XY plane of the magnetic disk apparatus 10 are applied. The rotation disturbance vibrations are acceleration velocity components serving as detection objects in the present embodiment; and, when a compensation signal based on the acceleration velocity detection signal 86 containing the rotation disturbance vibrations is applied to the positioning control unit 50 to perform feed forward control, the rotation disturbance vibrations can be cancelled out, and the positioning accuracy can be enhanced.

Figure 6:
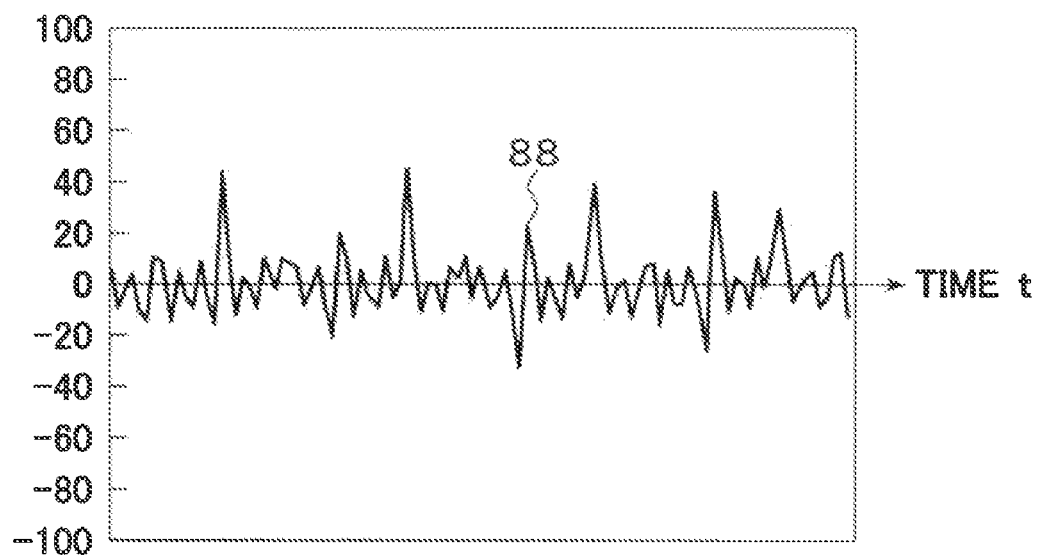
FIG. 6 is a time chart showing an acceleration velocity detection signal when power source ripple noise is applied.

FIG. 6 is a time chart showing an acceleration velocity detection signal 88 of the acceleration velocity sensors in the present embodiment in the case in which power source ripple noise is applied. When a compensation signal based on the acceleration velocity detection signal 88 containing the power source ripple noise is applied to the positioning control unit 50, since it is a noise component completely irrelevant to the rotation disturbance vibration component, rotation disturbance vibration compensation is not performed, and the positioning accuracy is deteriorated.

Figure 7:
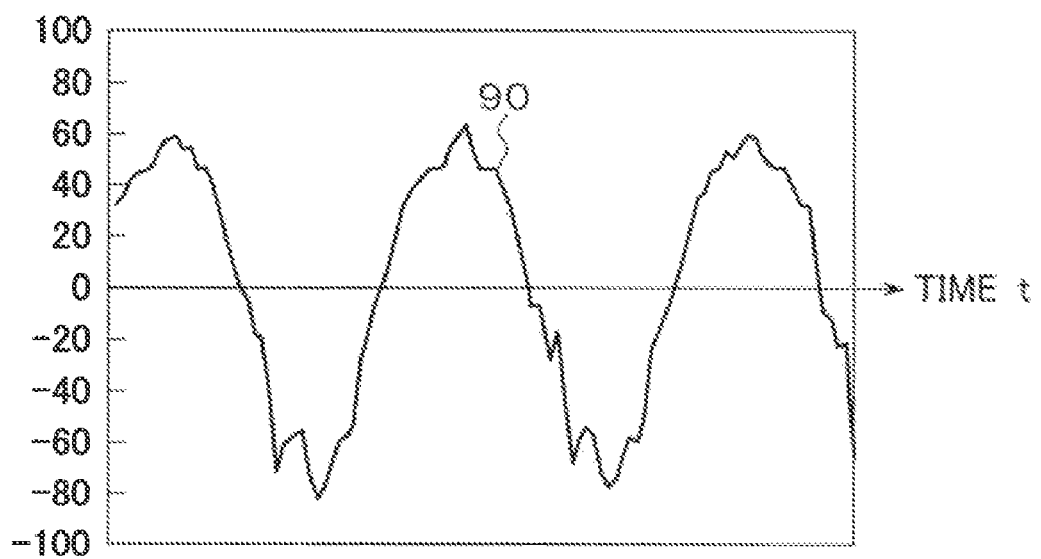
FIG. 7 is a time chart showing an acceleration velocity detection signal when translation disturbance vibration in the Z direction is applied.

FIG. 7 is a flow chart showing an acceleration velocity detection signal 90 output from the acceleration velocity sensors in the present embodiment in the case in which the translation disturbance vibrations 68 in the Z-axis direction shown in FIG. 3 are applied. The disturbance vibrations in the Z-axis direction are different from the rotation disturbance vibrations of FIG. 5, which are to be detected by the acceleration velocity sensors of the present embodiment, and it is the signal that does not serve as a compensation object. However, due to the disposition structure of the piezoelectric elements built in the acceleration velocity sensors 56-1 and 56-2, the acceleration velocity detection signal 90 having large variation corresponding to the acceleration velocity variation of the translation disturbance vibrations is output. When this is applied to the positioning control unit 50 without change so as to perform feed forward control, the positioning accuracy is largely deteriorated.

FIG. 8 is a block diagram showing a functional configuration for rotation disturbance compensation control according to the present embodiment, wherein a positioning control system 50-1 and a rotation disturbance compensation control system 54-1 are shown as functions of a servo control system. In FIG. 8, the positioning control system 50-1 includes the head 24, a position signal demodulation unit 70, a servo compensation unit 72, an adder unit 74, the VCM driver 52, and the VCM 18. Herein, the position signal demodulation unit 70 is a combined function of the signal processing unit 46 provided in the read channel 42 of FIGS. 1A and 1B and the position detection unit 48 provided in the hard disk controller 40 and demodulates a head position signal from the servo information obtained from the reading element of the head 24. The servo compensation unit 72 and the adder unit 74 are the functions of the positioning control unit 50 provided in the MPU 28 of FIGS. 1A and 1B and the functions realized by executing firmware programs by the MPU 28. The servo compensation unit 72 outputs a signal that is obtained by subjecting the head position signal output from the position signal demodulation unit 70 to proportional integration computing in accordance with needs with a deviation signal of the head position signal with respect to a target value for control to the track center of a target track. The adder unit 74 adds the compensation signal, which is output from the rotation disturbance compensation control system 54-1, to the control signal from the servo compensation unit 72 so as to perform feed forward control for rotation disturbance compensation. A control signal E5 from the adder unit 74 undergoes DA conversion in the VCM driver 52 and converted into a current signal and then drives the VCM 18, thereby driving the rotary actuator so that the head 24 follows the track center. The rotation disturbance compensation control system 54-1 includes the pair of acceleration velocity sensors 56-1 and 56-2, a differential amplifier 76 provided in the rotation vibration detection unit 58 of FIGS. 1A and 1B, an AD converter 78, a gain setter 80, and a switch 82. Herein, the AD converter 78, the gain setter 80, and the switch 82 are the functions of the rotation disturbance compensation control unit 54 provided in the MPU 28 of FIGS. 1A and 1B and are the functions realized by executing firmware programs by the MPU 28. The differential amplifier 76 amplifies and outputs a differential signal of an acceleration velocity detection signal E1 from the acceleration velocity sensor 56-1 and an acceleration velocity detection signal E2 from the acceleration velocity sensor 56-2. The differential signal of the outputs of the pair of acceleration velocity sensors 56-1 and 56-2 is obtained for the following reason. For example if the distances thereto from the Z axis are the same, acceleration velocities having the same magnitude in the opposite directions are applied in the tangent direction to the acceleration velocity sensors 56-1 and 56-2, which are disposed in the diagonal direction with respect to the rotation disturbance vibrations 66 shown in FIG. 3. Therefore, if the polarity of the acceleration velocity detection signal E1 from the acceleration velocity sensor 56-1 is positive, the polarity of the acceleration velocity detection signal E2 from the acceleration velocity sensor 56-2 is negative. When these are subjected to differential amplification in the differential amplifier 76, an added and amplified acceleration velocity detection signal (E1+E2) can be obtained for the rotation disturbance vibrations. Meanwhile, regarding the translation disturbance vibrations 68 shown in FIG. 3, acceleration velocities having the same magnitude in the same direction are applied to the acceleration velocity sensors 56-1 and 56-2. Therefore when the acceleration velocity detection signal E2 is subtracted from the acceleration velocity detection signal E1 by the differential amplifier 76, the translation disturbance vibration components can be cancelled out and eliminated to zero if the detection signals of the acceleration velocity sensors 56-1 and 56-2 are the same. However, in practice, if the translation disturbance vibrations 68 are generated, the acceleration velocities applied to the acceleration velocity sensors 56-1 and 56-2 cannot be the same, and an acceleration velocity detection signal based on a translation disturbance vibration component corresponding to the difference between them is output from the differential amplifier 76. The AD converter 78 retrieves the acceleration velocity detection signal E3, which is output from the differential amplifier 76, in synchronization with the sample timing of the servo information recorded in the magnetic disk, and the signal is multiplied by a predetermined gain by the gain setter 80 and then output to the adder unit 74, thereby performing the feed forward control of applying the compensation signal E4 for cancelling out the rotation disturbance component to the positioning control system. In addition to such positioning control system 50-1 and rotation disturbance compensation control system 54-1, in the present embodiment, the position error detection unit 60, the compensation control switching unit 62, and the switch 82 are further provided. As well as the case described about the MPU 28 of FIGS. 1A and 1B, at the timing upon write retry, upon read retry, or upon performance idle transition, the position error detection unit 60 obtains position errors and the square integration value over the detection period for each of the case in which the switch 82 of the rotation disturbance compensation control system is turned on and the case in which it is turned off aid outputs them to the compensation control switching unit 62. Herein, the position error detection unit 60 has to retrieve the position errors in the positioning control unit 50; and, as well as the case of the AD converter 78, they are retrieved at the timing of servo sampling, and discrete position errors in one rotation of the disk and the square integration values of the position errors of one disk rotation a re calculated. The compensation control switching unit 62 counts the number of times that the detected position errors exceeds predetermined slice levels in the case in which the switch 82 of the rotation disturbance compensation control system 54-1 is turned on and the case in which it is turned off, and turns off the switch 82 of the rotation disturbance compensation control system 54-1 if the number of times is zero. Meanwhile, when the number of times that the position signal exceeds the predetermined slice levels is one or more in the compensation control switching unit 62, the compensation control switching unit 62 compares the magnitude relation of the square integral values A and B of the position errors obtained from the position error detection unit 60 respectively for the case in which the switch 82 of the rotation disturbance compensation control system 54-1 is turned on and the case in which it is turned off, enables the rotation disturbance compensation control system 54-1 by turning on the switch 82 if the square integral value A of the case in which the switch 82 is turned on is larger, and disables the rotation disturbance compensation control system 54-1 by turning off the switch 82 if the square integration value B, which is detected when the switch 82 is turned off, is smaller. Herein, the rotation disturbance compensation control system 54-1 is enabled or disabled by turning on or off the switch 82 in the embodiment of FIG. 8; however, when the switch 82 is not provided, the gain of the gain setter 80 can be subjected to switching control by the compensation control switching unit 62. More specifically, the rotation disturbance compensation control system 54-1 can enable the compensation control switching unit 62 by setting gain=1 in the gain setter 80, and it can be disabled by setting gain=0. Alternatively, an output register is provided instead of the switch 82, the compensation control switching unit 62 can be enabled by setting a compensation signal in the output register, and it can be disabled by clearing the output register to all zero.

Figures 9A, 9B:
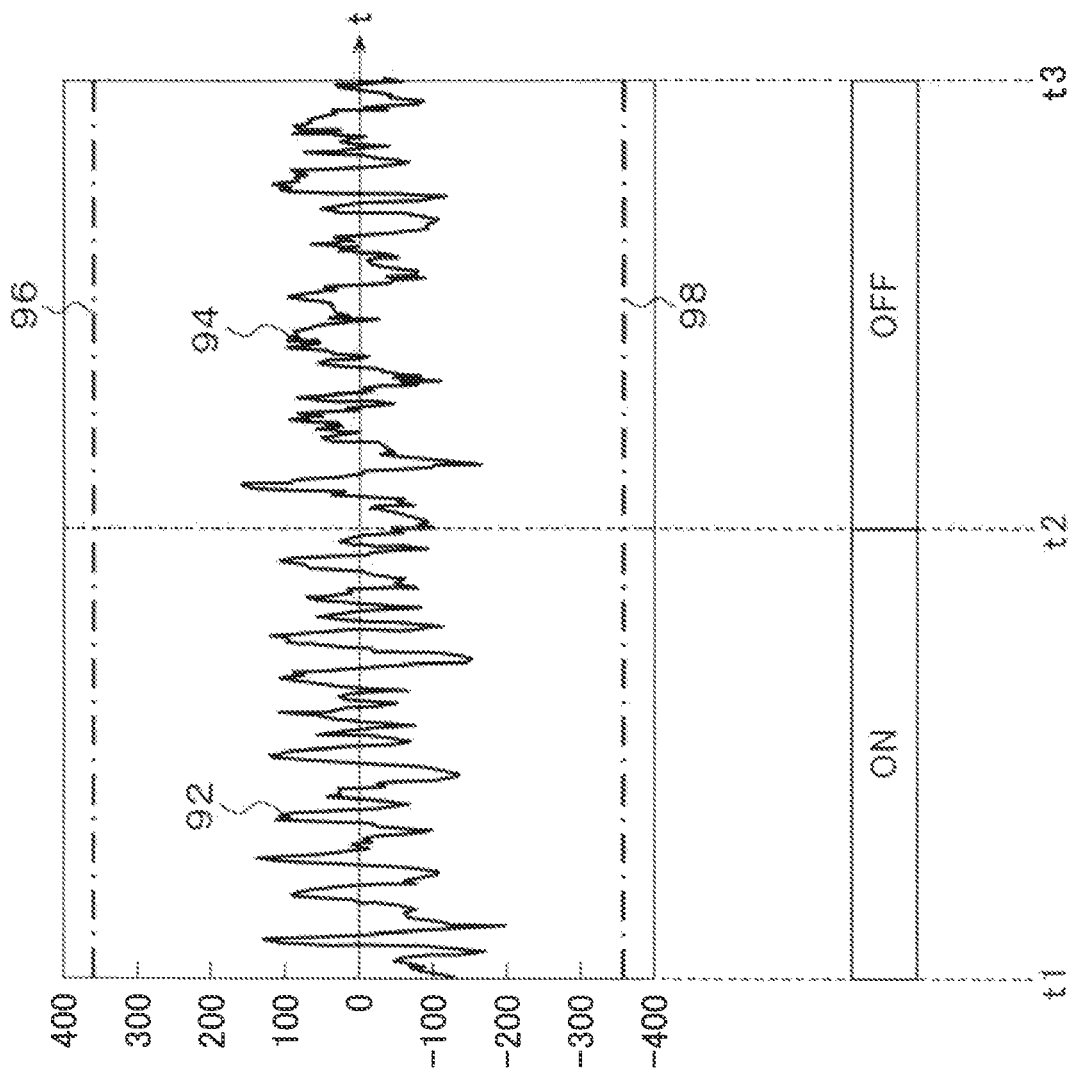
FIGS. 9A to 9C are time charts showing position error signals and position error square integration values of normal cases in the cases in which the rotation disturbance compensation control unit is turned on and off.
Figure 9C:
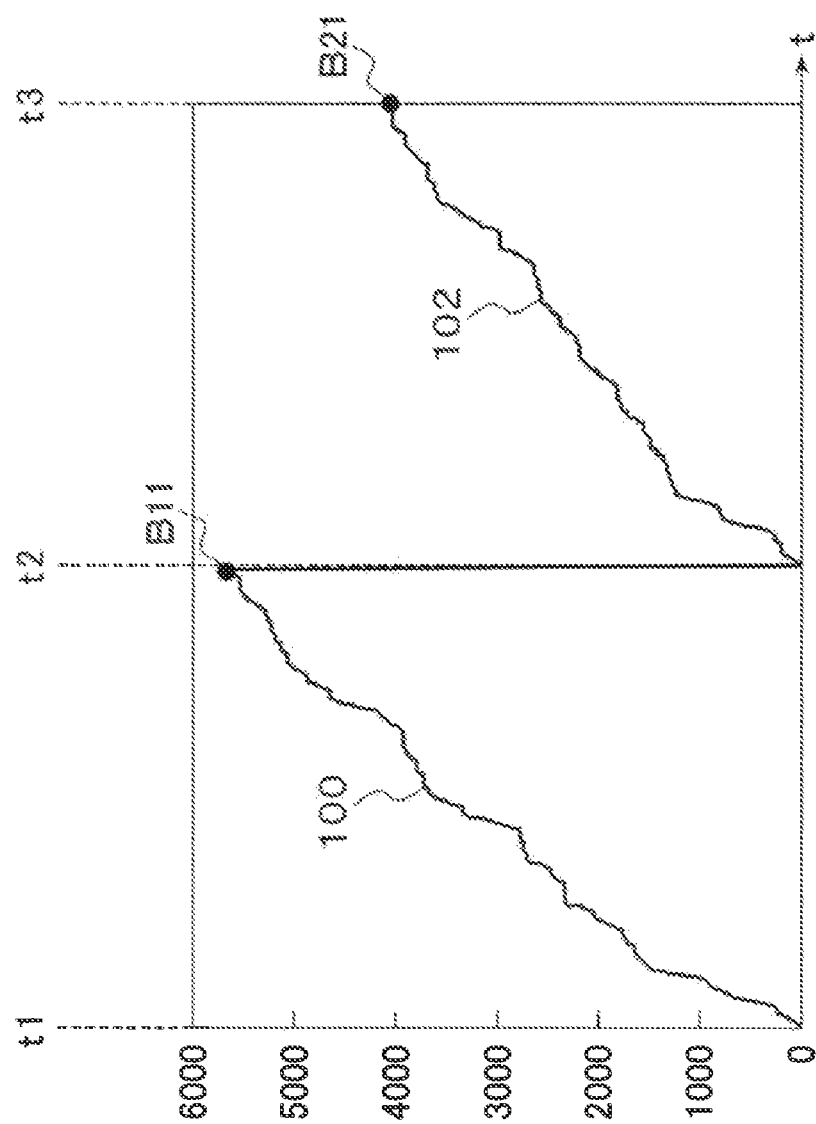

FIGS. 9A to 9C are time charts showing position errors obtained from the positioning control unit 50 and position error square integration values of a normal case not having foreign noise such as rotation disturbance vibrations, translation disturbance vibrations, and power source ripple noise in the present embodiment about the case in which the switch 82 of the rotation disturbance compensation control unit 54 is turned on and the case in which it is turned off (hereinafter, referred to as "on and off of the rotation disturbance compensation control").

FIG. 9A shows the position errors, FIG. 9B shows on and off of the rotation disturbance compensation control unit, and FIG. 9C shows the position error square integration values. Note that the numerical values shown at the vertical axis of the position errors of FIG. 9A are, for example, read values according to an AD converter, and FIG. 9C similarly shows read values of an AD converter which are relative numerical values.

In FIGS. 9A to 9C, the case in which the rotation disturbance compensation control is turned on is shown about time t1 to t2 as shown in FIG. 9B, and the case in which the rotation disturbance compensation control is turned off is shown about the rest, t2 to t3. When the rotation disturbance compensation control is turned on during the time t1 to t2, the acceleration velocity detection signal 84 of the normal case as shown in FIG. 4 is obtained as the acceleration velocity detection signal E3 from the differential amplifier 76, is read by the AD converter 78 in synchronization with servo sampling, and is applied from the adder unit 74 to the positioning control unit 50 as a compensation signal via the gain setter 80 and the switch 82, which is in an on state, thereby performing feed forward control for rotation disturbance compensation. Position errors 92 shown in FIG. 9A of the case in which the rotation disturbance compensation control is turned on during the time t1 to t2 are within the range of predetermined slice levels 96 and 98. A position error square integration value 100 shown in FIG. 9C obtained by squaring the position errors 92 over the time t1 to t2 and obtaining the integration value thereof increases as shown in the drawing and has the value of B11 at time t2 at the integration end. Next position errors 94 during the time t2 to t3 when the rotation disturbance compensation control is turned off are also within the slice levels 96 and 98. The position error square integration value 102 which is integration of the square values of the position errors also gradually increases as time elapses and reaches the value of B21 at the time t3. In such a normal case, in the present embodiment even when the number of times that the position errors 92 and 94 exceed the slice levels 96 and 98 is counted for each of the case in which the rotation disturbance compensation control is turned on and the case in which it is turned off, the number of times is zero; therefore the rotation disturbance compensation control is set to be off in this case. This normal case is in the state that the acceleration velocity detection signal 84 slightly contains the noise caused by the S/N ratio of the sensors itself as shown in FIG. 4, and the rotation disturbance compensation control is not particularly required; therefore, the rotation disturbance compensation control is fixed to be off.

Figures 10A, 10B:
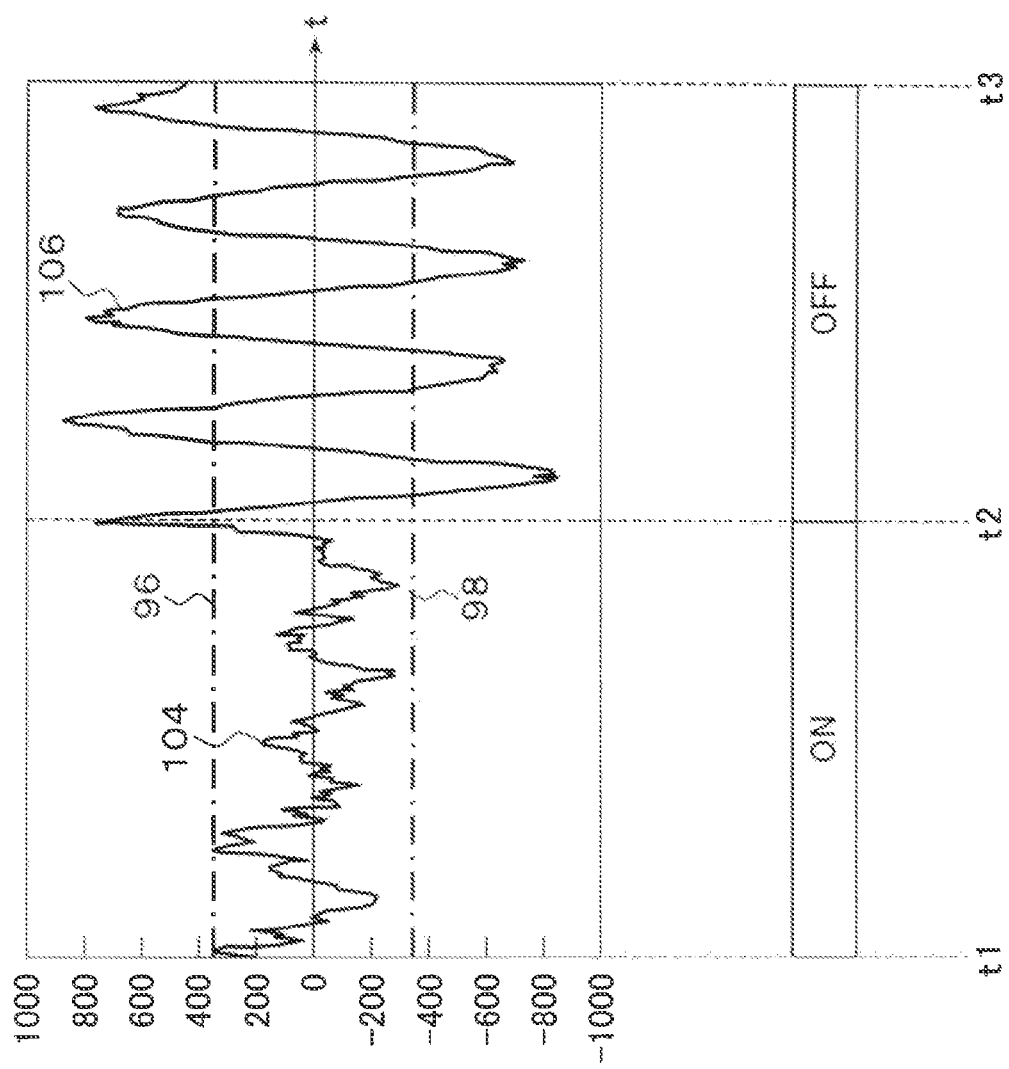
FIGS. 10A to 10C are time charts showing position error signals and position error square integration values when rotation disturbance vibration is applied in the cases in which the rotation disturbance compensation control unit is turned on and off.
Figure 10C:
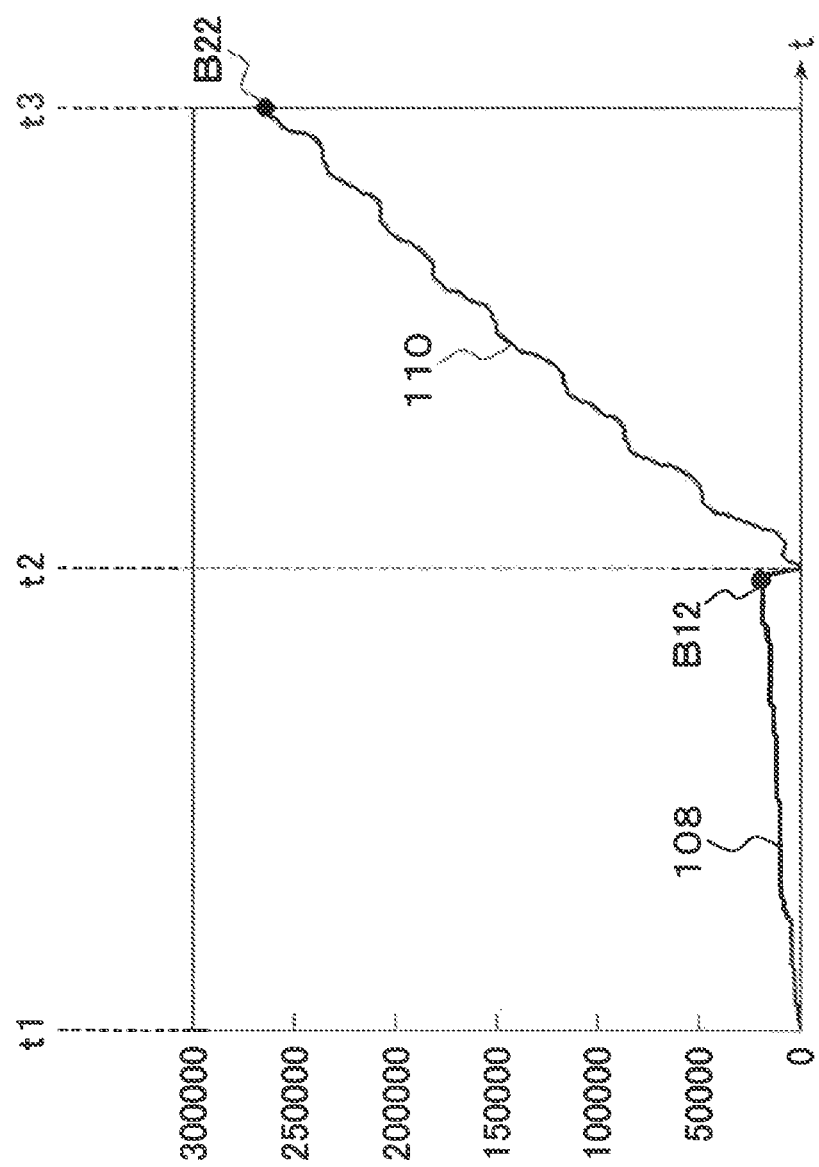

FIGS. 10A to 10C are time charts showing position errors and position error square integration values when rotation disturbance vibrations are applied in the case in which the rotation disturbance compensation control unit 54 is turned on and the case in which it is turned off. In FIGS. 10A to 10C, during the time t1 to t2 when the rotation disturbance compensation control is turned on as shown in FIG. 10B, the acceleration velocity detection signal 86 containing rotation disturbance vibration components as shown in FIG. 5 is applied to the positioning control unit 50 as a compensation signal, thereby performing feed forward control; therefore, the rotation disturbance components in the positioning control are cancelled out by the compensation signal and position errors 104 shown in FIG. 10A are within the range of the slice levels 96 and 98. A position error square integration value 108 shown in FIG. 10C which is integration of the square values of the position errors 104 is also not largely increased even though time integration over the time t1 to t2 is performed and reaches the value of B12. On the other hand, when the rotation disturbance compensation control is turned off as shown in the time t2 to t3, the compensation signal that cancels out the rotation disturbance vibration components is not applied to the positioning control unit 50; therefore, position errors 106 are affected by the rotation disturbance vibration components and are largely varied over the slice levels 96 and 98. As a result, a position error square integration value 110 shown in FIG. 10C of the case in which the rotation disturbance compensation control is turned off is largely increased along with time elapse of the time t2 to t3, the final value thereof is B22 which has a large value compared with the final value B12 of the case in which the rotation disturbance compensation control is turned on. In such a case, in the present embodiment, both in the case in which the rotation disturbance compensation control is turned on and the case in which it is turned off, the number of times of the position errors 104 and 106 that exceed the slice level 96, 98 is counted. In this case, regarding the position errors 106 of the case in which the rotation disturbance compensation control is turned off, the number of times that they exceed the slice level 96, 98 is one or more; therefore, the final values B12 and B22 of the position error square integration values 108 and 110 of FIG. 10C obtained in the case in which the rotation disturbance compensation control is turned on and the case in which it is turned off are compared. In this case, B12 is smaller than B22; therefore, it is switched to turn on the rotation disturbance compensation control which is used in detection of B12 having the smaller value.

Figures 11A, 11B:
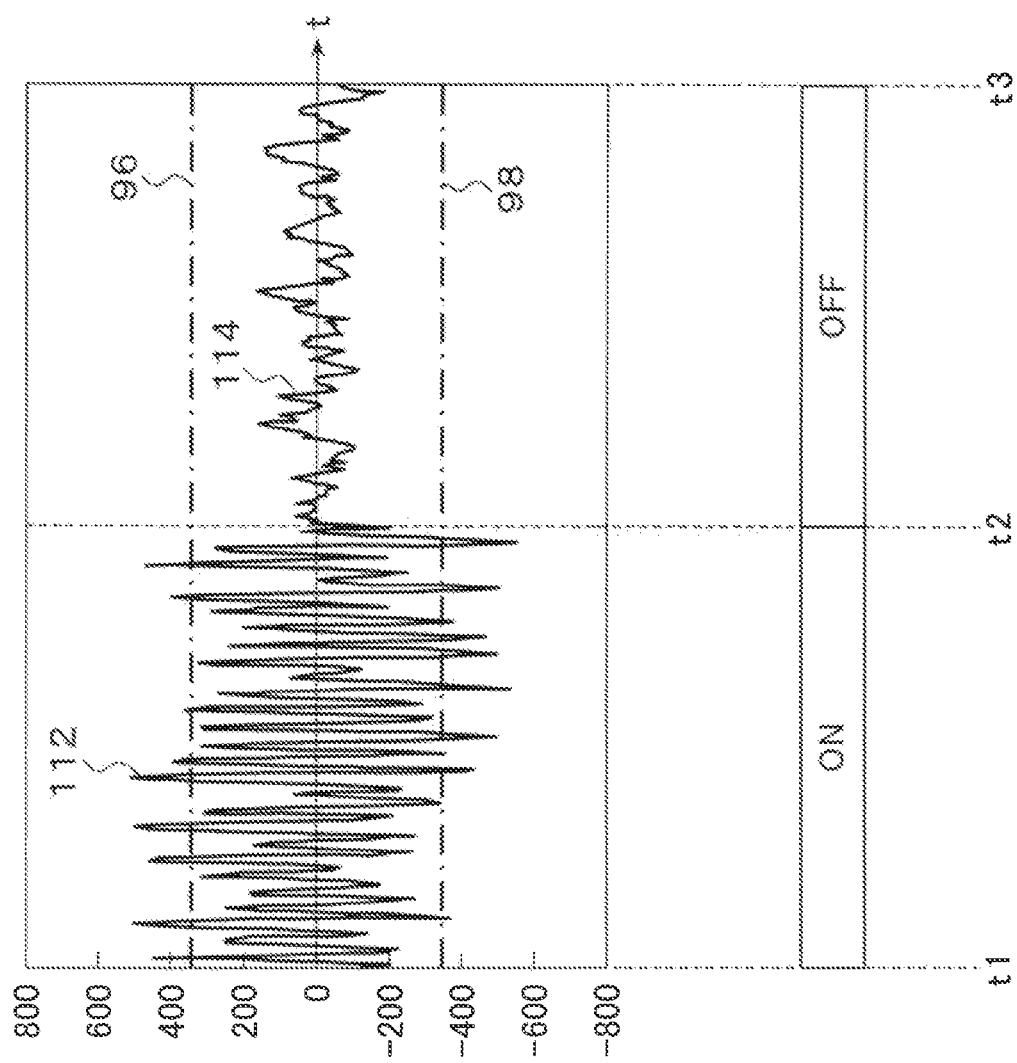
FIGS. 11A to 11C are time charts showing position error signals and position error square integration values when power source ripple noise is applied in the cases in which the rotation disturbance compensation control unit is turned on and off.
Figure 11C:
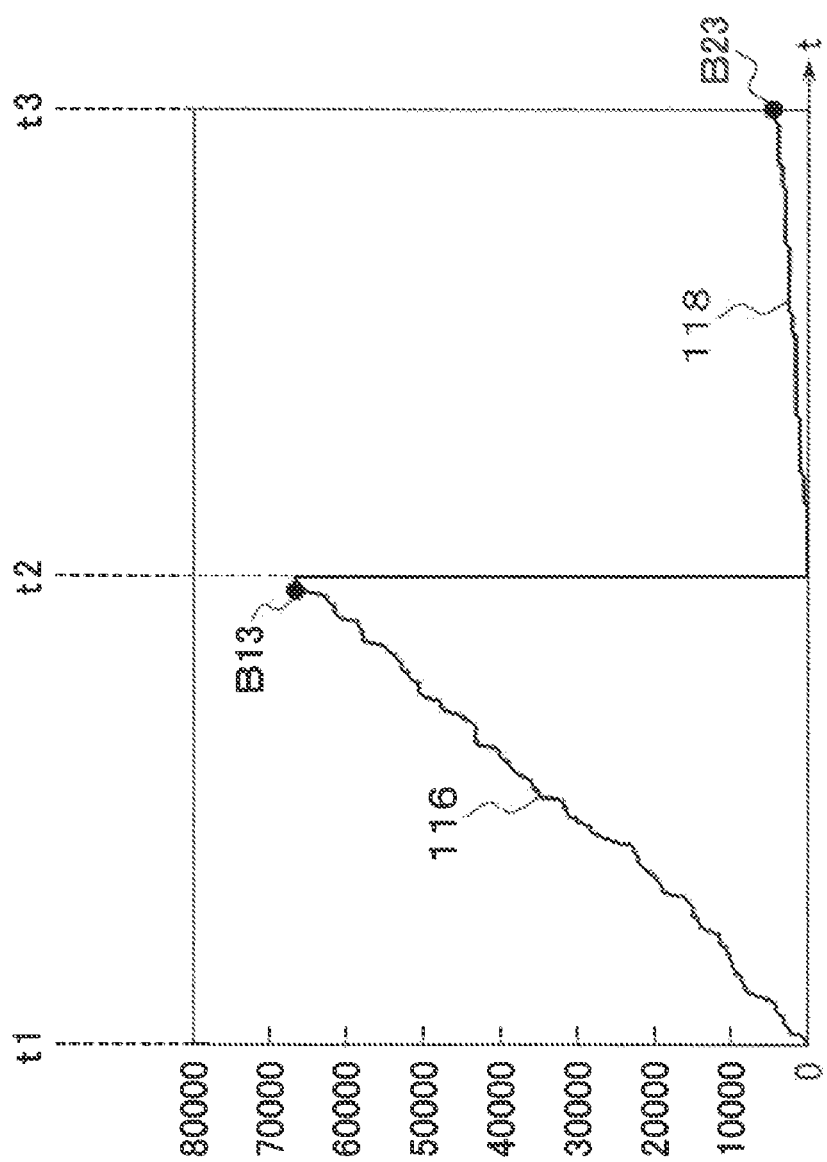

FIGS. 11A to 11C are time charts showing position errors and position error square integration values of the case in which power source ripple noise is applied when the rotation disturbance compensation control is turned on and when it is turned off. In FIGS. 11A to 11C, as shown in FIG. 11B, the rotation disturbance compensation control is turned on during time t1 to t2; therefore, the acceleration velocity detection signal 88 containing power source ripple noise as shown in FIG. 6 is detected and applied to the positioning control unit 50 as a compensation signal, and the compensation signal of the power source ripple noise which is an object not to be originally compensated for is applied. Therefore, as shown in FIG. 11A, position errors 112 are largely varied over the slice levels 96 and 98, and a position error square integration value 116 of FIG. 11C also has a large value B13 at the integration end time t2. Subsequently, when the rotation disturbance compensation control is turned off in the time t2 to t3 as shown in FIG. 11B, the compensation signal based on the acceleration velocity detection signal 88 containing power source ripple noise as shown in FIG. 6 is not applied to the positioning control unit 50; therefore, position errors 114 approximately equivalent to those of the normal case shown in FIGS. 9A to 9C are obtained, and they are within the range not exceeding the slice levels 96 and 98. Therefore, a position error square integration value 118 of FIG. 11C reaches B23 as a final value and is also within a small value. In such a case in which the power source ripple noise is applied, position errors 112 of the case in which the rotation disturbance compensation control is turned on during the time t1 to t2 exceed the slice levels 96 and 98, and the number of times thereof is one or more; therefore the final values B13 and B23 of the position error square integration values of FIG. 11C are compared, and it is switched to turn off the rotation disturbance compensation control which corresponds to the smaller one, B23.

Figures 12A, 12B:
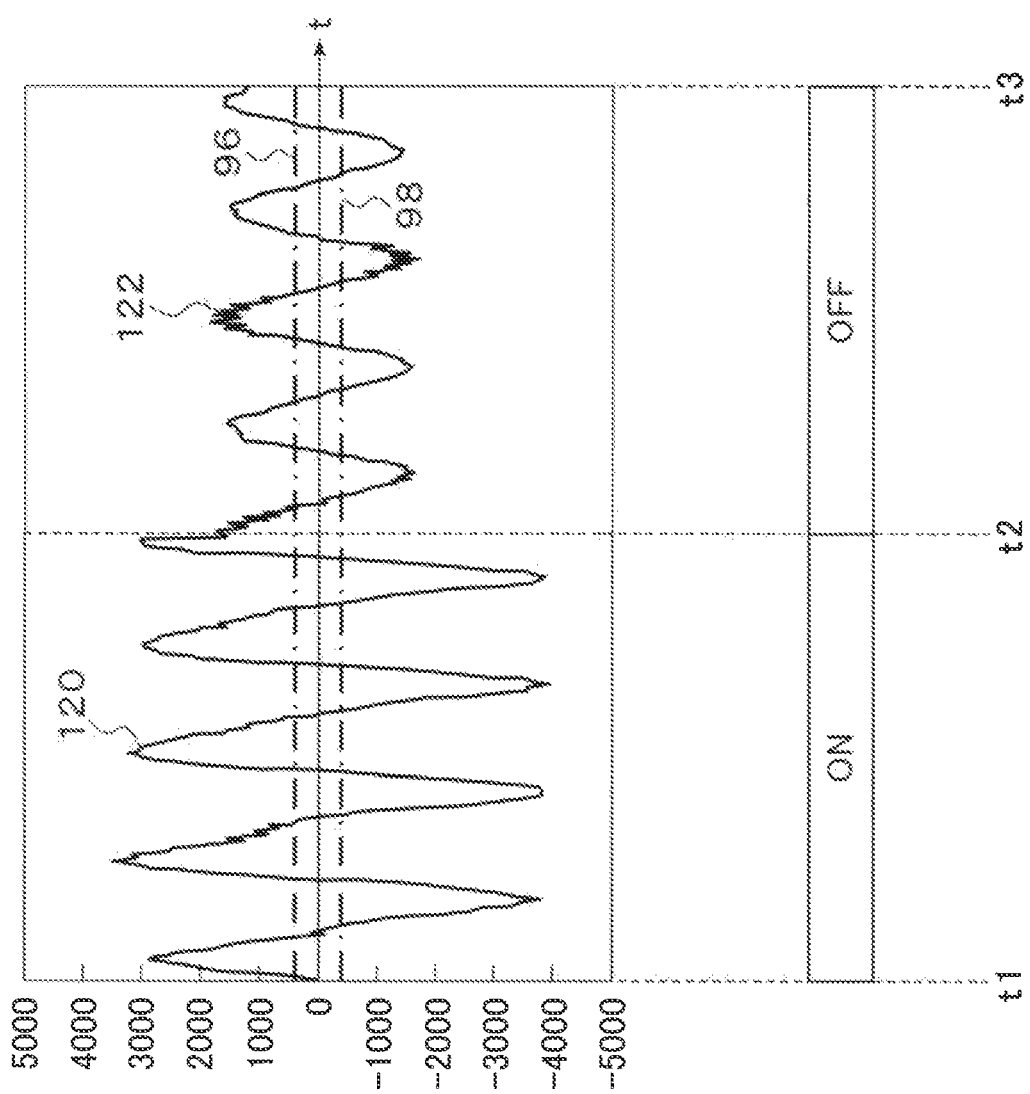
FIGS. 12A to 12C are time charts showing position error signals and position error square integration values when translation disturbance vibration in the z direction is applied in the cases in which the rotation disturbance compensation control unit is turned on and off.
Figure 12C:
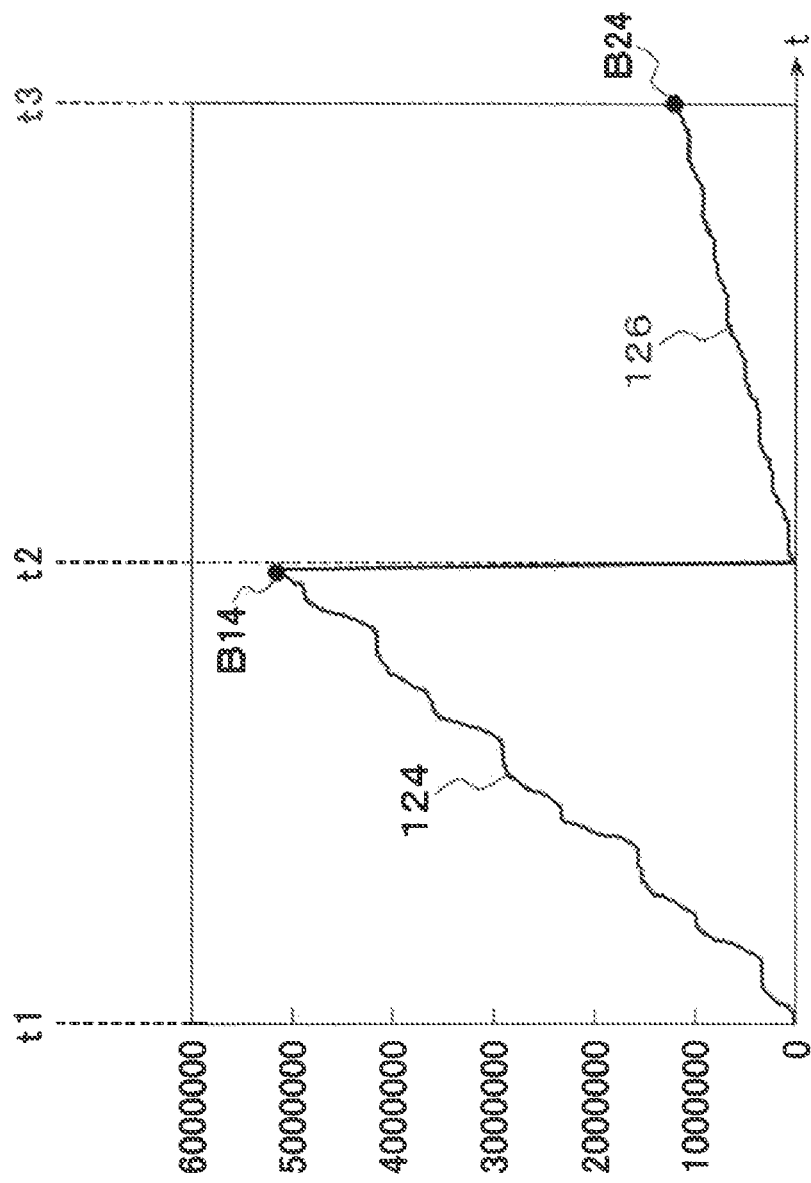

FIGS. 12A to 12C are time charts showing position errors and position error square integration values of the case in which translation disturbance vibrations in the Z direction are applied in the present embodiment when the rotation disturbance compensation control unit is turned on and when it is turned off. In FIGS. 12A to 12C, when the rotation disturbance compensation control is turned on during the time t1 to t2 as shown in FIG. 12B, the compensation signal based on the acceleration velocity detection signal 90 as shown in FIG. 7 containing the translation vibration components in the Z-axis direction is applied to the positioning control unit 50, thereby performing feed forward control; therefore, the positioning accuracy is largely deteriorated, and the position errors largely exceeding the slice levels 96 and 98 are generated as shown in position errors 120 of FIG. 12A. Therefore, a position error square integration value 124 of FIG. 12C also increases along with time elapse and has a final value of B14. When the rotation disturbance compensation control is subsequently turned off as shown in the time t2 to t3, the acceleration velocity detection signal 90 having the translation disturbance vibration components in the Z-axis direction as shown in FIG. 7 is not applied to the positioning control unit 50 as a compensation signal; therefore, compared with the case in which the rotation disturbance compensation control is turned on, as shown by position errors 122, they are within a smaller range although they exceed the slice levels 96 and 98. Therefore, the increasing rate of a position error square integration value 126 of FIG. 12C is also small, and the final value thereof is B24. In such a case in which the translation vibration components of the Z-axis direction are applied, when the number of times that the position errors of FIG. 12A exceed the slice levels 96 and 98 is counted in both the case in which the rotation disturbance compensation control is turned on and the case it is turned off, the number of times is one or more, therefore, the final values B14 and B24 of the position error square integration values 124 and 126 obtained in FIG. 12C are compared with each other, and it is switched to turn off the rotation disturbance compensation control which corresponds to the smaller one, B24.

Figure 13A:
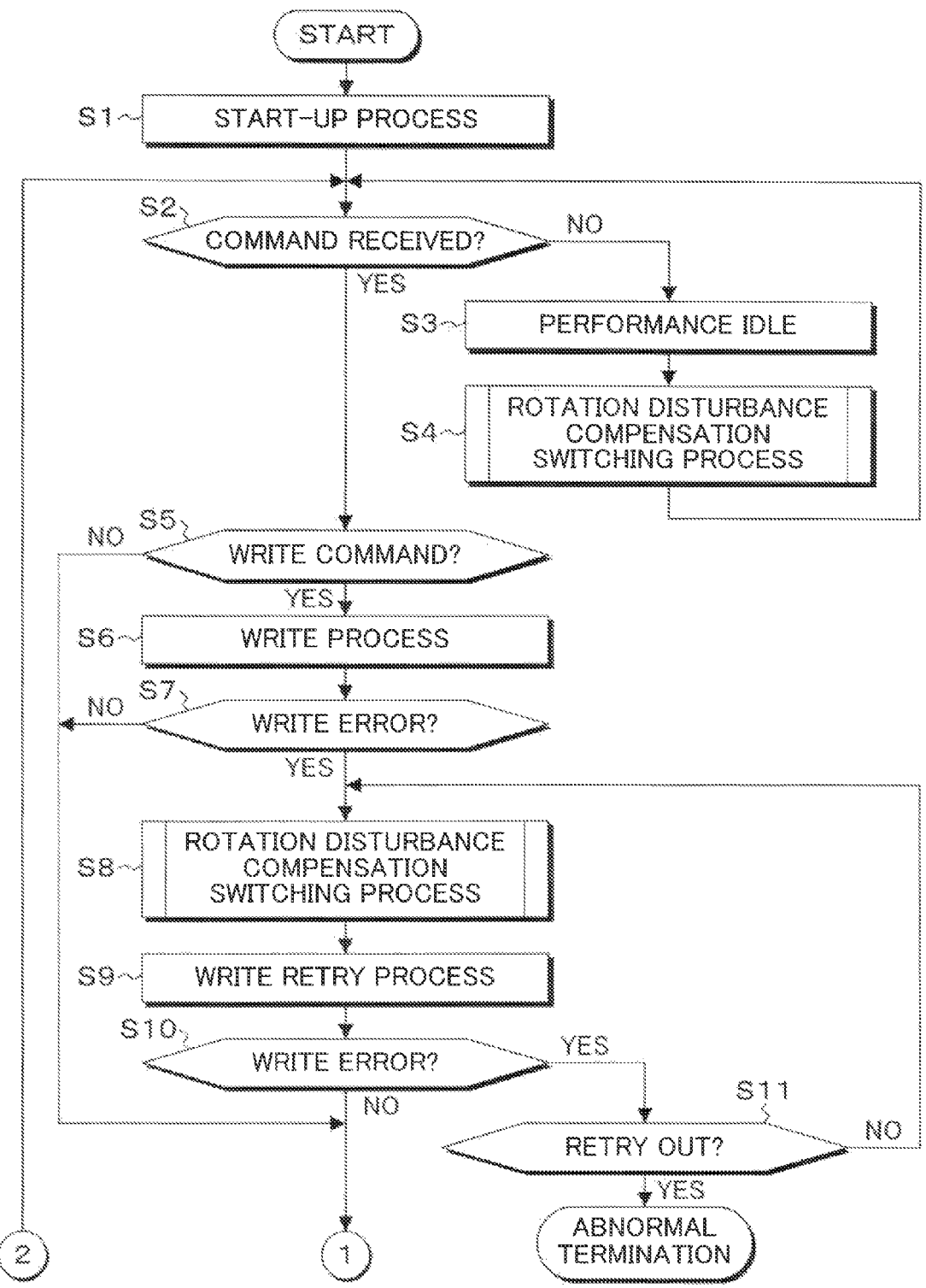
FIGS. 13A and 13B are flow charts showing a control process of the magnetic disk apparatus including a switching process of the rotation disturbance compensation control unit according to the present embodiment.
Figure 13B:
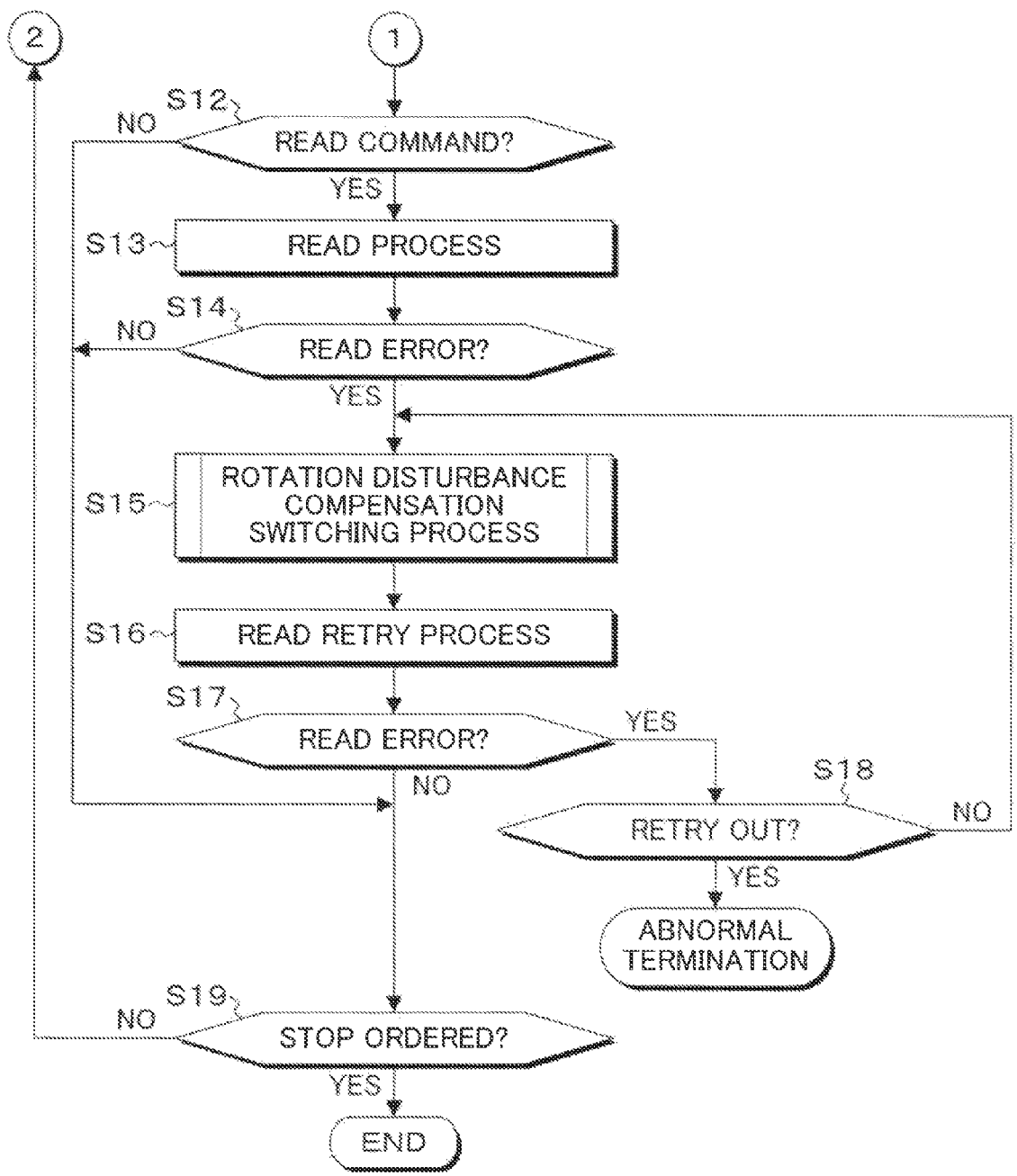

FIGS. 13A and 13B are flow charts showing a control process of the magnetic disk apparatus including a switching process of the rotation disturbance compensation control according to the present embodiment. In FIGS. 13A and 13B, when the power of the magnetic disk apparatus 10 is turned on, a start-up process is performed in step S1. This start-up process is executed by, for example, loading a firmware program from the magnetic disk medium to the memory 31 by executing boot code and executing it by the MPU 28 after self diagnosis and initial processing is performed. When device ready of the magnetic disk apparatus 10 is achieved by the start-up process, the process proceeds to step S2, wherein whether a command is received from the host is checked. When no command is received from the host, the process undergoes transition to performance idle after certain period of time in step S3, and a rotation disturbance compensation switching process according to the present embodiment is executed in step S4. When command receipt from the host is determined in step S2, whether it is a write command is determined in step S5; and, if it is a write command, a write process is executed in step S6. When a write error is determined in step S7 about this write process the process proceeds to step S8 wherein the rotation disturbance compensation switching process according to the present embodiment is executed, and then a write retry process is executed in step S9. When a write error occurs again about the write retry process in step S10, whether it reaches a predetermined number of times of write retries which is set in advance and retry out occurs is checked in step S11. If it is not retry out, the processes from step S8 are repeated. If retry out occurs in step S11, abnormal termination is carried out. When no write error occurs in step S10 through the write retry process of step S9, the process proceeds to the process of step S12. In step S12, whether the command received in step S2 is a read command is checked; and, when it is determined to be a read command, a read process is executed in step S13. When a read error is determined in step S14 about this read process, the rotation disturbance compensation switching process is executed in step S15, and then a read retry process is executed in step S16. When a read error is detected again in step S17 about this read retry process, the processes from step S14 are repeated until retry out occurs in step S18. If no read error occurs, the process proceeds to step S19 and the processes from step S2 are repeated until there is a stop order.

Figure 14A:
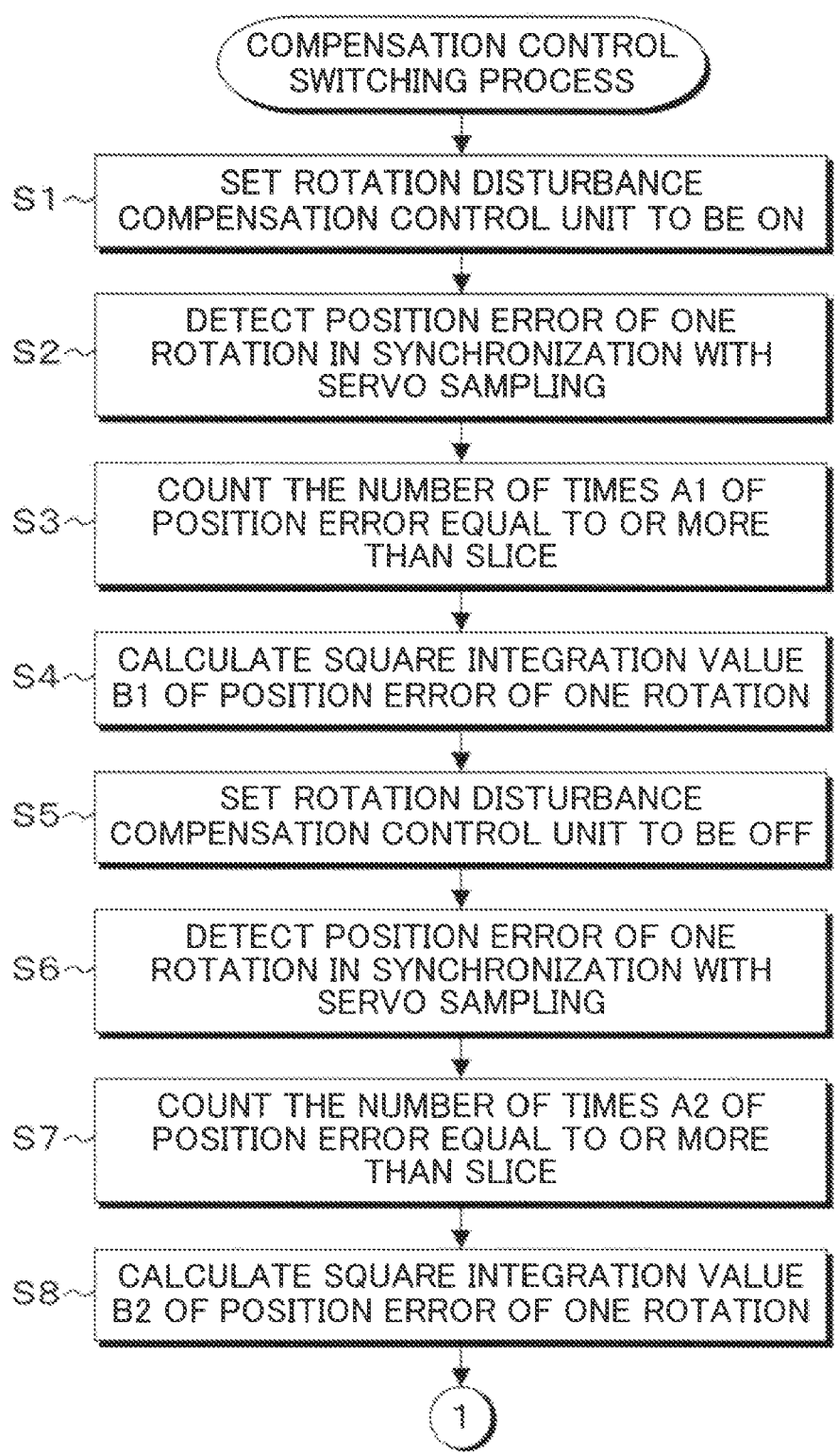
FIGS. 14A and 14B are flow charts showing details of the switching process of the rotation disturbance compensation control unit in steps S4, S8, and S15 of FIGS. 13A and 13B.
Figure 14B:
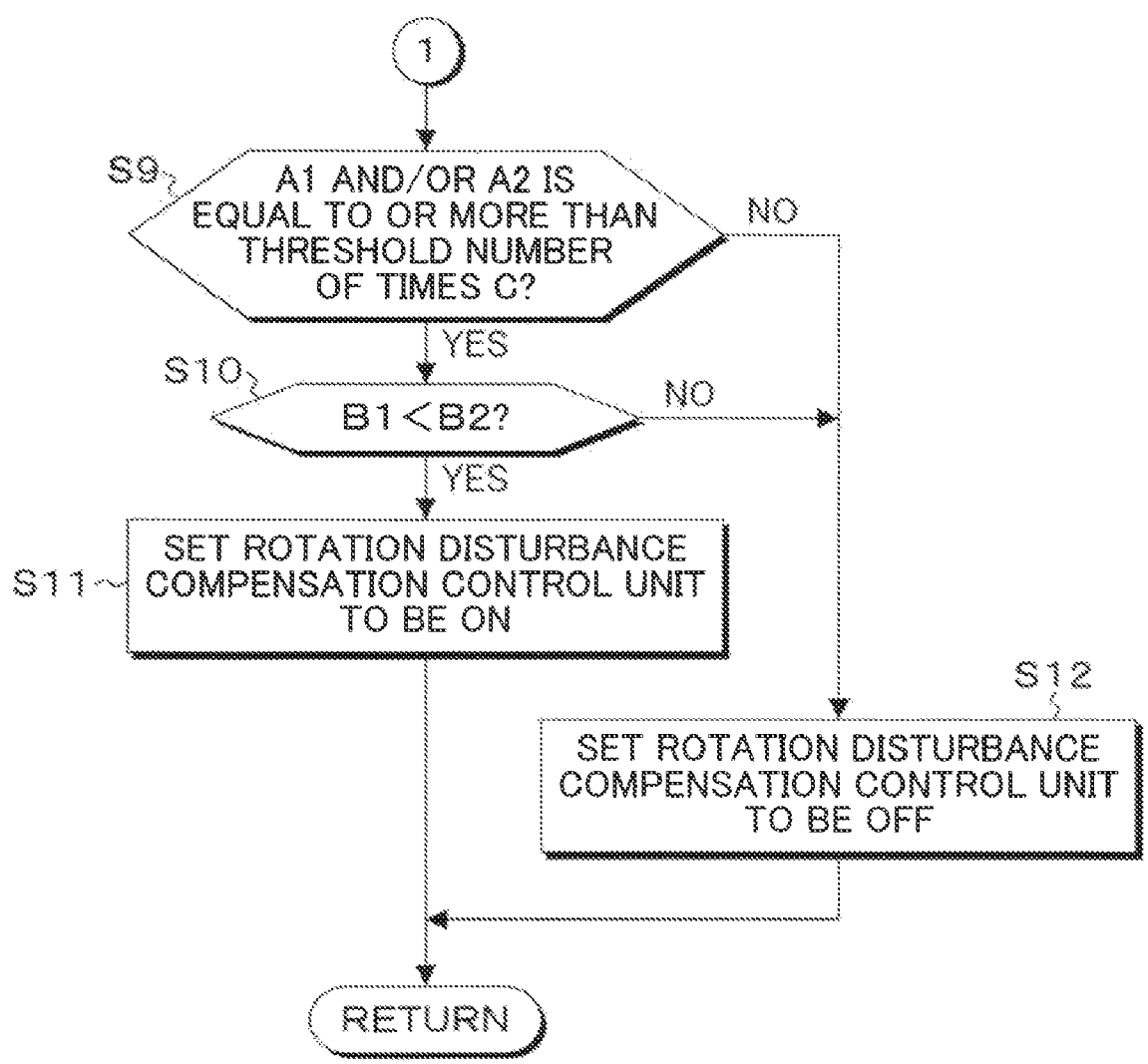

FIGS. 14A and 14B are flow charts showing details of the rotation disturbance compensation switching processes in steps S4, S8, and S15 of FIGS. 13A and 13B, and it will be described below with reference to FIG. 8. In FIGS. 14A and 14B, first of all, in step S1, the switch 82 for enabling the rotation disturbance compensation control unit 54 is turned on. Next, in step S2, in synchronization with servo sampling, the control signal output from the adder unit 74 is retrieved and detected by the position error detection unit 60 as position errors over one rotation of the magnetic disk. Subsequently, in step S3, the number A1 of the position errors equal to or more than predetermined slices is counted regarding the detected position errors. Subsequently, in step S4, the square integration value B1 of the position errors of one rotation is calculated. Next, in step S5, the switch 82 for disabling the rotation disturbance compensation control unit 54 is turned off. Subsequently, in step S6, in synchronization with servo sampling, the output of the adder 74 is retrieved by the position error detection unit 60 as position errors over one rotation of the magnetic disk. Subsequently, in step S7, the number A2 of the position errors equal to or more than the slices is counted. Subsequently, in step S8, the square integration value B2 of the position errors corresponding to one rotation of the magnetic disk is calculated. Subsequently, in step S9, whether the number A1 or A2 of the position errors equal to or more than the predetermined slices detected in the case in which the switch 82 of the rotation disturbance compensation control unit 54 is turned on by the process of the compensation control switching unit 62 and the case in which it is turned off is equal to or more than a predetermined threshold number C, for example C=1 is checked. When both or either one of the numbers A1 and A2 is equal to or more than the threshold number C=1, the process proceeds to step S10 wherein whether the square integration value B1 of the position errors of the case in which the rotation disturbance compensation control unit 54 is turned on is smaller than the square integration value B2 of the position errors of the case in which the rotation disturbance compensation control unit 54 is turned off is checked, wherein the values B1 and B2 are calculated in steps S4 and S8. If the square integration value B1 is smaller, the process proceeds to step S11, wherein the switch 82 of the rotation disturbance compensation control unit 54 is switched to on and enabled. Meanwhile, if both the numbers A1 and A2 of the position errors exceeding the slice levels obtained in the case in which the switch 82 of the rotation disturbance compensation control unit 54 is turned on and the case in which it is turned off are zero in step S9, the process proceeds to step S12, wherein the switch 82 of the rotation disturbance compensation control unit 54 is switched to off so as to disable it. Note that, in the present embodiment, the compensation control switching process for compensating for the rotation disturbance vibrations is performed at the timing of performance idle transition, write retry occurrence, and read retry occurrence; however, other than the timing, with respect to an access request from the host, it can be executed at arbitrary timing that does not deteriorate processing performance. In the embodiment, detection of the position errors and position error square integration values of the case in which the switch 82 of the rotation disturbance compensation control unit 54 is turned on and the case in which it is turned off is performed over the period of one rotation of the magnetic disk; however, it may be performed over plural rotations of the magnetic disk or in the range of a predetermined number of sectors which is less than one rotation. The present invention includes arbitrary modifications that do not impair the object and advantages thereof, and the present invention is not limited by the numerical values shown in the above described embodiments.

What is claimed is:

1. A storage apparatus comprising:
    a positioning control unit which positions a head to a target track of a rotating storage medium and causes the head to follow it;
    a compensation control unit which applies a compensation signal to the positioning control unit so that a rotation disturbance vibration component detected by an acceleration velocity sensor is cancelled out;
    a position error detection unit which detects, at predetermined timing, respective position errors according to the positioning control unit in the case in which the compensation control unit is enabled and the case in which the compensation control unit is disabled; and
    a compensation control switching unit which switches the compensation control unit either between an enabled state and a disabled state based on the magnitude relation of two position errors detected by the position error detection unit,
    wherein the position error detection unit discretely detects the respective position errors according to the positioning control unit in the case in which the compensation control unit is enabled and the case in which the compensation control unit is disabled in a predetermined period and detects a square integration value of the positioning errors over the predetermined period; and
    the compensation control switching unit disables the compensation control unit if both the two position errors are less than a predetermined threshold value and enables or disables the compensation control unit based on the magnitude relation of the two square integration values if at least either one of the two position errors exceeds a predetermined threshold value.

2. The storage apparatus according to claim 1, wherein the compensation control switching unit enables the compensation control unit if the square integration value of the case in which the compensation control unit is enabled is small and disables the compensation control unit if the square integration value of the case in which the compensation control unit is disabled is small.

3. The storage apparatus according to claim 1, wherein the compensation control switching unit turns on the compensation signal to be applied to the positioning control unit if the compensation control unit is to be enabled and turns off the compensation signal to be applied to the positioning control unit if the compensation control unit is to be disabled.

4. The storage apparatus according to claim 1, wherein the compensation control switching unit adjusts the compensation signal to be applied to the positioning control unit by multiplying the signal by a predetermined gain if the compensation control unit is to be enabled and turns off the compensation signal to be applied to the positioning control unit if the compensation control unit is to be disabled.

5. The storage apparatus according to claim 1, wherein the position error detection unit and the compensation control switching unit operate upon occurrence of write retry.

6. The storage apparatus according to claim 1, wherein the position error detection unit and the compensation control switching unit operate upon occurrence of read retry.

7. A storage apparatus comprising:

a positioning control unit which positions a head to a target track of a rotating storage medium and causes the head to follow it;

a compensation control unit which applies a compensation signal to the positioning control unit so that a rotation disturbance vibration component detected by an acceleration velocity sensor is cancelled out;

a position error detection unit which detects, at predetermined timing, respective position errors according to the positioning control unit in the case in which the compensation control unit is enabled and the case in which the compensation control unit is disabled; and a compensation control switching unit which switches the compensation control unit either between an enabled state and a disabled state based on the magnitude relation of two position errors detected by the position error detection unit, wherein the position error detection unit and the compensation control switching unit operate upon transition to idle in which no command is received from a host.

8. The storage apparatus according to claim 1, wherein the compensation control unit detects a differential signal of acceleration velocity detection signals from a pair of acceleration velocity sensors as the rotation disturbance vibration detection signal.

9. A control method of a storage apparatus including:

a positioning control step of positioning a head to a target track of a rotating storage medium and causing the head to follow it;

a compensation control step of applying a compensation signal to the positioning control step so that a rotation disturbance vibration component detected by an acceleration velocity sensor is cancelled out;

a position error detection step of detecting, at predetermined timing, respective position errors according to the positioning control step in the case in which the compensation control step is enabled and the case in which the compensation control step is disabled; and a compensation control switching step of switching the compensation control step either between an enabled state and a disabled state based on the magnitude relation of two position errors detected by the position error detection steps, wherein in the position error detection step. the respective position errors are discretely detected according to the positioning control step in the case in which the compensation control step is enabled and the case in which the compensation control step is disabled in a predetermined period, and a square integration value of the positioning errors over the predetermined period is detected; and the compensation control switching step in which the compensation control step is disabled if both the two position errors are less than a predetermined threshold value and the compensation control step is enabled or disabled based on the magnitude relation of the two square integration values if at least either one of the two position errors exceeds a predetermined threshold value.

10. The control method of the storage apparatus according to claim 9, wherein the compensation control switching step enables the compensation control step if the square integration value of the case in which the compensation control unit is enabled is small and disables the compensation control step if the square integration value of the case in which the compensation control unit is disabled is small.

11. The control method of the storage apparatus according to claim 9, wherein the compensation control switching step turns on the compensation signal to be applied to the positioning control step if the compensation control step is to be enabled and turns off the compensation signal to be applied to the positioning control step if the compensation control step is to be disabled.

12. The control method of the storage apparatus according to claim 9, wherein the compensation control switching step adjusts the compensation signal to be applied to the positioning control step by multiplying the signal by a predetermined gain if the compensation control step is to be enabled and turns off the compensation signal to be applied to the positioning control step if the compensation control step is to be disabled.

13. The control method of the storage apparatus according to claim 9, wherein the position error detection step and the compensation control switching step are operated upon occurrence of write retry.

14. The control method of the storage apparatus according to claim 9, wherein the position error detection step and the compensation control switching step are operated upon occurrence of read retry.

15. The control method of the storage apparatus according to claim 9, wherein the position error detection step and the compensation control switching step are operated upon transition to idle in which no command is received from a host.

16. A storage control device comprising:

a positioning control unit which positions a head to a target track of a rotating storage medium and causes the head to follow it;

a compensation control unit which applies a compensation signal to the positioning control unit so that a rotation disturbance vibration component detected by an acceleration velocity sensor is cancelled out;

a position error detection unit which detects, at predetermined timing, respective position errors according to the positioning control unit in the case in which the compensation control unit is enabled and the case in which the compensation control unit is disabled; and a compensation control switching unit which switches the compensation control unit either between an enabled state and a disabled state based on the magnitude relation of two position errors detected by the position error detection unit, wherein the position error detection unit discretely detects the respective position errors according to the positioning control unit in the case in which the compensation control unit is enabled and the case in which the compensation control unit is disabled in a predetermined period and detects a square integration value of the positioning errors over the predetermined period; and the compensation control switching unit
disables the compensation control unit if both the two position errors are less than a predetermined threshold value and
enables or disables the compensation control unit based on the magnitude relation of the two square integration values if at least either one of the two position errors exceeds a predetermined threshold value.

17. The storage control device according to claim 16, wherein the compensation control switching unit
enables the compensation control unit if the square integration value of the case in which the compensation control unit is enabled is small and
disables the compensation control unit if the square integration value of the case in which the compensation control unit is disabled is small.

* * * * *